United States Patent
Ishikawa

(10) Patent No.: US 8,753,782 B2
(45) Date of Patent: Jun. 17, 2014

(54) COOLING SYSTEM AND METHOD OF A FUEL CELL

(75) Inventor: Tomotaka Ishikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 381 days.

(21) Appl. No.: 13/284,281

(22) Filed: Oct. 28, 2011

(65) Prior Publication Data

US 2012/0045706 A1 Feb. 23, 2012

Related U.S. Application Data

(62) Division of application No. 12/085,958, filed as application No. PCT/IB2006/003552 on Dec. 11, 2006.

(30) Foreign Application Priority Data

Dec. 12, 2005 (JP) .................................. 2005-357543
Mar. 16, 2006 (JP) .................................. 2006-073071
Nov. 22, 2006 (JP) .................................. 2006-316178

(51) Int. Cl.
*H01M 8/04* (2006.01)
(52) U.S. Cl.
USPC .......................................... 429/434; 429/428
(58) Field of Classification Search
USPC ......................................................... 429/429
See application file for complete search history.

(56) References Cited

U.S. PATENT DOCUMENTS

| | | |
|---|---|---|
| 2002/0184908 A1 | 12/2002 | Brotz et al. |
| 2005/0039959 A1 | 2/2005 | Fruhauf et al. |
| 2005/0097917 A1 | 5/2005 | Hanada |
| 2005/0255351 A1 | 11/2005 | Fukuda |
| 2006/0099469 A1* | 5/2006 | Meltser et al. .................. 429/24 |
| 2006/0112695 A1* | 6/2006 | Neubauer et al. ............... 60/714 |

FOREIGN PATENT DOCUMENTS

| | | |
|---|---|---|
| JP | 2000-106206 A | 4/2000 |
| JP | 2002-127734 A | 5/2002 |
| JP | 2002-280006 A | 9/2002 |
| JP | 2004-259615 A | 9/2004 |
| JP | 2004-345426 A | 12/2004 |

(Continued)

OTHER PUBLICATIONS

Office Action issued Nov. 23, 2011 in U.S. Appl. No. 12/085,958.

(Continued)

*Primary Examiner* — Ula C Ruddock
*Assistant Examiner* — Jacob Marks
(74) *Attorney, Agent, or Firm* — Kenyon & Kenyon LLP

(57) ABSTRACT

A cooling system of a fuel cell is provided with a main cooling flow passage and a bypass cooling flow passage which is arranged parallel with the main cooling flow passage and diverts the same coolant, as flow passages through which coolant flows. A radiator and a coolant circulation pump and the like are arranged in the main cooling flow passage. Coolant from the main cooling flow passage enters the bypass cooling flow passage and reaches a second heat exchanger via a case of a motor of an ACP and the like. At the second heat exchanger, heat exchange is also performed with a supply gas flow passage, after which the coolant returns to the main cooling flow passage. The manner in which the coolant is distributed can be changed depending on where the coolant is diverted from the main cooling flow passage and the arrangement of the circulation pump.

3 Claims, 12 Drawing Sheets

(56) References Cited

FOREIGN PATENT DOCUMENTS

| JP | 2005-032685 A | 2/2005 |
|---|---|---|
| JP | 2005-050638 A | 2/2005 |
| JP | 2005-079007 A | 3/2005 |
| JP | 2005-093412 A | 4/2005 |
| JP | 2005-100752 A | 4/2005 |
| JP | 2005-243429 A | 9/2005 |
| WO | 03/059664 A1 | 7/2003 |
| WO | 2004/027908 A2 | 4/2004 |
| WO | WO 2004/069572 * | 8/2004 |

OTHER PUBLICATIONS

Office Action issued Aug. 17, 2011 in U.S. Appl. No. 12/085,958 (parent application).
Office Action issued Jan. 31, 2012 in Japanese Patent Application No. 2006-316178 and English translation thereof.

* cited by examiner

COOLING SYSTEM AND METHOD OF A FUEL CELL

This is a division of application Ser. No. 12/085,958 filed 3 Jun. 2008, which is a 371 national phase application of PCT/IB2006/003552 filed 11 Dec. 2006, claiming priority to Japanese Patent Applications No. 2005-357543 filed 12 Dec. 2005, No. 2006-073071 filed 16 Mar. 2006, and No. 2006-316178 filed 22 Nov. 2006, respectively, the contents of which are incorporated herein by reference.

BACKGROUND OF THE INVENTION

1. Field of the Invention

The invention relates to a cooling system and method of a fuel cell which generates electricity by an electrochemical reaction produced by supplying a fuel gas to an anode side and supplying an oxidizing gas to a cathode side.

2. Description of the Related Art

Fuel cells are being used in vehicles because they have little effect on the environment. A fuel cell produces the necessary power by, for example, supplying a fuel gas such as hydrogen to an anode side of a fuel cell stack and an oxidizing gas that includes oxygen, such as air, to a cathode side, and producing a reaction between the two through an electrolyte membrane. This reaction generates heat in the fuel cell so to cool it, a coolant such as cooling water is circulated through the fuel cell stack and then cooled by a radiator or the like. In order to warm up a cold fuel cell at startup, the coolant is heated to an appropriate temperature by a heater, for example. In this way, the coolant is circulated through the fuel cell stack and its temperature adjusted.

Also, a gas compressor such as an air compressor (ACP) is used to appropriately pressurize the oxidizing gas supplied to the cathode side of the fuel cell stack. As the ACP operates, it also generates heat and is therefore cooled by a heat exchanger, referred to as an intercooler. In addition, vehicles are also provided with a heat exchanger for air-conditioning the cabin. In this way, vehicles are provided with various heat exchangers for different purposes so it would be reasonable to consider their shared use.

For example, Japanese Patent Application Publication No. JP-A-2005-79007 describes a fuel cell system that prevents clogging while helping to make up for insufficient humidity from a humidifier provided on the cathode side of the fuel cell. Here, both coolant for cooling the cathode supply gas and coolant for cooling the fuel cell stack are shared and the heat exchanger for cooling the cathode supply gas and the fuel cell stack are connected in series by a coolant flow passage. Two three-way valves which change the direction of coolant flow depending on whether the temperature of the fuel cell is high or low are arranged midway in this coolant flow passage.

Also, Published Japanese National Phase Application No. 2005-514261 of PCT application describes a method for heating and cooling a vehicle having a fuel cell as an air-conditioning apparatus and heating source which easily compensates for insufficient heat when the external temperature is low, and which also enables both sufficient cooling of the fuel cell apparatus and comfortable air conditioning when the external temperature is high. According to the technology described in that publication, a common coolant is used to cool the heating source and provide air conditioning for the vehicle so only a single coolant circuit is used. This coolant circuit branches off into a first sub-circuit and a second sub-circuit at a branching point. The first sub-circuit distributes coolant to the fuel cell apparatus, while the second sub-circuit distributes coolant to the air conditioning apparatus of the vehicle. After circulating through these apparatuses, the distributed coolants then merge together again at a merging point. That is, a heat exchanger of the fuel cell apparatus and a heat exchanger of the air conditioning apparatus are arranged in series in a single loop.

In the related art, when independently controlling these heat exchangers, the coolant circuit and the control thereof are independent from one another which is inconvenient. When the cooling system of the fuel cell stack and the cooling system of the cathode supply gas are controlled independently, the temperature of the cathode supply gas entering the fuel cell stack is determined by the cooling system of the cathode supply gas, and the temperature of the cathode supply gas (so-called cathode off gas) exiting the fuel cell stack is mostly determined by the cooling system of the fuel cell stack. If these two cooling systems are controlled independently from one another, the temperature difference between temperature of the cathode supply gas entering the fuel cell stack and the temperature of the cathode off gas may become too large, which may result in the following problems.

For example, a humidifier is provided parallel with the fuel cell stack to appropriately humidify the cathode supply gas and supply that humidified gas to the fuel cell stack, but the temperature difference between both ends of the humidifier may become too great. The humidifier used may have a well-known tubular construction, but if the temperature difference between both ends of the humidifier becomes too great, this tubular construction may become damaged and not work sufficiently. Thus, having the coolant circuits and controls thereof independent from one another for each of the fuel cell heat exchangers not only makes the structure complicated, but also results in inefficient use of the coolant and may lead to problems such as that described above.

Japanese Patent Application Publication No. JP-A-2005-79007 and Published Japanese National Phase Application No. 2005-514261 of PCT application describe related art which share the coolant for cooling the cathode supply gas and the coolant for cooling the fuel cell stack and use a common coolant for cooling the fuel cell, i.e., the heating source, and providing air conditioning for the cabin of the vehicle. With these technologies, a fuel cell stack and another heat exchanger for cooling are arranged in series in the coolant flow passage and the same coolant is shared. As a result, regulation of the temperature of the fuel cell stack and regulation of the temperatures of the cathode supply gas and the vehicle cabin are interdependent. Accordingly, although the coolant is used more efficiently in these technologies, the respective temperatures can not be controlled independently. Thus, it is just as difficult to appropriately regulate the temperatures as it is when the respective cooling systems are controlled independently.

In this way, in the related art, temperature regulation of the fuel cell stack and temperature regulation of the cathode supply gas and the vehicle cabin are not cooperatively controlled.

SUMMARY OF THE INVENTION

In view of the foregoing problems, this invention thus provides a cooling system of a fuel cell which cooperatively controls a cooling system of a fuel cell stack and another heat exchange system.

An aspect of the invention relates to a cooling system of a fuel cell which generates electricity by an electrochemical reaction produced by supplying a fuel gas to an anode side and an oxidizing gas to a cathode side, which is characterized by including a cooling flow passage through which coolant circulates between a fuel cell stack and a radiator, and a second heat exchanger which is provided parallel with the fuel cell stack and uses coolant that has been diverted from the cooling flow passage.

Also, another aspect of the invention relates to a cooling system of a fuel cell which generates electricity by an electrochemical reaction produced by supplying a fuel gas to an anode side and an oxidizing gas to a cathode side, which is characterized by including a cooling flow passage through which coolant circulates between a fuel cell stack and a radiator, and a second heat exchanger which is provided parallel with the radiator and uses coolant that has been diverted from the cooling flow passage.

Also, the second heat exchanger may also serve as a cooling apparatus of a gas compressor for supplying oxidizing gas.

Also, the fuel cell may be a vehicular fuel cell mounted in a vehicle, an air conditioning heat exchanger for air conditioning a vehicle cabin may be provided parallel with the fuel cell stack, and coolant that has been diverted from the cooling flow passage may be used in the air conditioning heat exchanger.

The cooling system of a fuel cell may also include a coolant circulation pump arranged in series in the cooling flow passage, and a humidifier arranged in parallel with respect to a cathode side inlet of the fuel cell stack through which the oxidizing gas is supplied to the cathode side of the fuel cell and a cathode side outlet of the fuel cell stack through which the gas is discharged. The humidifier may be arranged downstream of the coolant circulation pump and upstream of the fuel cell stack, and the second heat exchanger may use coolant taken from downstream of the radiator and upstream of the coolant circulation pump.

The cooling system of a fuel cell may also include a coolant circulation pump arranged in series in the cooling flow passage, and a humidifier arranged in parallel with respect to a cathode side inlet of the fuel cell stack through which the oxidizing gas is supplied to the cathode side of the fuel cell and a cathode side outlet of the fuel cell stack through which the gas is discharged. The humidifier may be arranged downstream of the coolant circulation pump and upstream of the fuel cell stack, and the second heat exchanger may use coolant taken from downstream of the coolant circulation pump and upstream of the humidifier.

The cooling system of a fuel cell may also include a coolant circulation pump arranged in series in the cooling flow passage, and a humidifier arranged in parallel with respect to a cathode side inlet of the fuel cell stack through which the oxidizing gas is supplied to the cathode side of the fuel cell and a cathode side outlet of the fuel cell stack through which the gas is discharged. The humidifier may be arranged upstream of the coolant circulation pump and downstream of the radiator, and the second heat exchanger may use coolant taken from downstream of the radiator and upstream of the humidifier.

The cooling system of a fuel cell may also include a coolant circulation pump arranged in series in the cooling flow passage, and a humidifier arranged in parallel with respect to a cathode side inlet of the fuel cell stack through which the oxidizing gas is supplied to the cathode side of the fuel cell and a cathode side outlet of the fuel cell stack through which the gas is discharged. The humidifier may be arranged downstream of the coolant circulation pump and upstream of the fuel cell stack, and the air conditioning heat exchanger may use coolant taken from downstream of the humidifier and upstream of the fuel cell stack.

The cooling system of a fuel cell may also include a coolant circulation pump arranged in series in the cooling flow passage, and a humidifier arranged in parallel with respect to a cathode side inlet of the fuel cell stack through which the oxidizing gas is supplied to the cathode side of the fuel cell and a cathode side outlet of the fuel cell stack through which the gas is discharged. The humidifier may be arranged downstream of the coolant circulation pump and upstream of the fuel cell stack, and the air conditioning heat exchanger may use coolant taken from downstream of the radiator and upstream of the coolant circulation pump.

The cooling system of a fuel cell may also include a coolant circulation pump arranged in series in the cooling flow passage, a humidifier arranged in parallel with respect to a cathode side inlet of the fuel cell stack through which the oxidizing gas is supplied to the cathode side of the fuel cell stack and a cathode side outlet of the fuel cell stack through which gas is discharged, and bypass location switching means for switching a location of at least one of an inlet and an outlet of a bypass flow passage which diverts coolant from the cooling flow passage to the second heat exchanger.

The cooling system of a fuel cell may also include a coolant circulation pump arranged in series in the cooling flow passage, a humidifier arranged in parallel with respect to a cathode side inlet of the fuel cell stack through which the oxidizing gas is supplied to the cathode side of the fuel cell stack and a cathode side outlet of the fuel cell stack through which gas is discharged, and bypass location switching means for switching a location of at least one of an inlet and an outlet of a bypass flow passage which diverts coolant from the cooling flow passage to the air conditioning heat exchanger.

The cooling system of a fuel cell may also include a first coolant circulation pump arranged in series in the cooling flow passage, an air conditioning bypass flow passage which is a bypass flow passage through which coolant that has been diverted from the cooling flow passage flows and in which the air conditioning heat exchanger, a heater, and a second coolant circulation pump are arranged, a circulation flow passage arranged in parallel with the air conditioning bypass flow passage, and air conditioning bypass switching means for switching a connection between the air conditioning bypass flow passage and the cooling flow passage and a connection between the air conditioning bypass flow passage and the circulation flow passage.

Also, the air conditioning bypass switching means may switch the connection between a closed loop connection in which the air conditioning bypass flow passage and the circulation flow passage are connected in a closed loop and cut off from the cooling flow passage, and a direct connection in which the air conditioning bypass flow passage and the cooling flow passage are directly connected and cut off from the circulation flow passage.

The second circulation pump may be a pump which operates with better efficiency than the first circulation pump when the flow rate of the coolant is low, and pump operation controlling means may also be provided for controlling operation of the first circulation pump and operation of the second circulation pump in connection with one another according to the operating state of the fuel cell, and when the fuel cell is operating under a low load, stopping operation of the first circulation pump and circulating coolant to the fuel cell stack using the second circulation pump.

Also, the cooling system of a fuel cell of the invention may include a coolant circulation pump arranged in series in the cooling flow passage, and the second heat exchanger may take in coolant from upstream of the radiator and downstream of the fuel cell stack, and return coolant to downstream of the radiator and upstream of the fuel cell stack.

Also, the cooling system of a fuel cell of the invention may include a coolant circulation pump arranged in series in the cooling flow passage, and the second heat exchanger may take in coolant from downstream of the coolant circulation pump and upstream of the fuel cell stack.

Also, the cooling system of a fuel cell of the invention may include a coolant circulation pump arranged in series in the cooling flow passage, and the air conditioning heat exchanger may take in coolant from downstream of the coolant circulation pump and upstream of the fuel cell stack.

Also, the cooling system of a fuel cell of the invention may include a coolant circulation pump arranged in series in the cooling flow passage, and the air conditioning heat exchanger may take in coolant from downstream of the fuel cell stack and upstream of the radiator.

EFFECTS OF THE INVENTION

At least one of the foregoing structures includes a cooling flow passage through which coolant circulates between a fuel cell stack and a radiator, and a second heat exchanger which is provided parallel with the fuel cell stack and uses coolant that has been diverted from the cooling flow passage. Also, at least one of the foregoing structures includes a cooling flow passage through which coolant circulates between a fuel cell stack and a radiator, and a second heat exchanger which is provided parallel with the radiator and uses coolant that has been diverted from the cooling flow passage. Therefore, the coolant is shared between the fuel cell stack and the second heat exchanger. Because the main cooling flow passage that passes through the radiator and a bypass cooling flow passage that passes through the second heat exchanger are parallel to one another, the fuel cell stack cooling system and the second heat exchanger system can be cooperatively controlled by controlling the distribution ratio (i.e., the ratio of the coolant that flows through the main cooling flow passage with respect to the coolant that flows through the bypass cooling flow passage). The distribution ratio may also be controlled by setting or changing the flow passage resistance ratio between the main cooling flow passage and the bypass cooling flow passage, the position in which the coolant supply pump is arranged, and the position in which the coolant circulation pump is arranged. Alternatively, the distribution ratio may be controlled by determining the amount of coolant using a control valve that controls the distribution ratio. The flow passage resistance ratio may also be set according to the location where the bypass cooling flow passage separates from the main cooling flow passage and the shapes of the flow passages and the like.

Also, the second heat exchanger also serves as the cooling apparatus of the gas compressor for supplying oxidizing gas. Therefore, the fuel cell stack cooling system and the cooling system of the gas compressor for supplying oxidizing gas can be cooperatively controlled in combination.

Moreover, the air conditioning heat exchanger for air conditioning the vehicle cabin is provided parallel with the fuel cell stack and coolant in the cooling flow passage is diverted. Therefore, the fuel cell stack cooling system and the vehicle cabin air conditioning system can be cooperatively controlled in combination. Further, the fuel cell stack cooling system, the cooling system of the gas compressor for supplying oxidizing gas, and the vehicle cabin air conditioning system can all be cooperatively controlled in combination.

Also, in the cooling system of a fuel cell, the coolant distribution ratio differs depending on the structure of the cooling system, especially the position in which the circulation pump is arranged. Therefore, the structure of the cooling system can be selected according to how the coolant is to be distributed among the fuel cell stack, the second heat exchanger, and the air conditioning heat exchanger.

According to at least one of the foregoing structures, the humidifier is arranged downstream of the coolant circulation pump, and upstream of the fuel cell stack, and the second heat exchanger uses coolant taken from downstream of the radiator and upstream of the coolant circulation pump. According to this structure, (the amount of coolant flowing through the radiator)+(the amount of coolant flowing through the second heat exchanger)=total amount of coolant=(the amount of coolant flowing through the fuel cell stack)+(the amount of coolant flowing through the humidifier). Therefore, if (the amount of coolant flowing through the humidifier) is reduced, then a considerable amount of coolant can be supplied to the fuel cell stack.

Also, according to at least one of the foregoing structures, the humidifier is arranged downstream of the coolant circulation pump and upstream of the fuel cell stack, and the second heat exchanger uses coolant taken from downstream of the coolant circulation pump and upstream of the humidifier. According to this structure, (the amount of coolant flowing through the radiator)=total amount of coolant=(the amount of coolant flowing through the second heat exchanger)+(the amount of coolant flowing through the fuel cell stack)+(the amount of coolant flowing through the humidifier). Therefore, the maximum amount of coolant can be supplied to the radiator.

Also, according to at least one of the foregoing structures, the humidifier is arranged upstream of the coolant circulation pump and downstream of the radiator, and the second heat exchanger uses coolant taken from downstream of the radiator and upstream of the humidifier. According to this structure, (the amount of coolant flowing through the radiator)+(the amount of coolant flowing through the second heat exchanger)+(the amount of coolant flowing through the humidifier)=total amount of coolant=(the amount of coolant flowing through the fuel cell stack). Therefore, the maximum amount of coolant can be supplied to the fuel cell stack.

Also, according to at least one of the foregoing structures, the coolant circulation pump is arranged in series in the cooling, flow passage, the humidifier is arranged downstream of the coolant circulation pump and upstream of the fuel cell stack, and the air conditioning heat exchanger uses coolant taken from downstream of the humidifier and upstream of the fuel cell stack. According to this structure, (the amount of coolant flowing through the radiator)+(the amount of coolant flowing through the second heat exchanger)=total amount of coolant=(the amount of coolant flowing through the humidifier)+(the amount of coolant flowing through the fuel cell stack)+(the amount of coolant flowing through the air conditioning heat exchanger). Therefore, coolant can be supplied to the air conditioning heat exchanger while an appropriate amount of coolant is supplied to the fuel cell stack.

Also, according to at least one of the foregoing structures, the coolant circulation pump is arranged in series in the cooling flow passage, the humidifier is arranged downstream of the coolant circulation pump and upstream of the fuel cell stack, and the air conditioning heat exchanger uses coolant taken from downstream of the radiator and upstream of the coolant circulation pump. According to this structure, (the amount of coolant flowing through the radiator)+(the amount of coolant flowing through the air conditioning heat exchanger)+(the amount of coolant flowing through the second heat exchanger)=total amount of coolant=(the amount of coolant flowing through the humidifier)+(the amount of coolant flowing through the fuel cell stack). Therefore, coolant can be supplied to other elements while a considerable amount of coolant is supplied to the fuel cell stack.

Moreover, bypass location switching means is provided for switching the location of the inlet and outlet of the bypass flow passage which diverts coolant from the cooling flow passage to the second heat exchanger. Therefore, for example, a coolant amount appropriate for the operating state of the fuel cell stack is able to be supplied to the fuel cell stack by switching the bypass location according to the operating state of the fuel cell stack.

Also, bypass location switching means is provided for switching the position in the cooling flow passage of the inlet and outlet of the bypass flow passage which diverts the coolant from the cooling flow passage to the air conditioning heat exchanger. Therefore, a coolant amount appropriate for the vehicle cabin temperature can be supplied to the air conditioning heat exchanger by switching the bypass location according to the vehicle cabin temperature and the like.

Also, the air conditioning bypass flow passage in which the air conditioning heat exchanger, the heater, and the second coolant circulation pump are arranged, as well as the circulation flow passage which is arranged in parallel with the air conditioning bypass flow passage are provided, and the connection between the air conditioning bypass flow passage and the cooling flow passage, as well as the connection between the air conditioning bypass flow passage and the circulation flow passage is switched when diverting coolant from the cooling flow passage to the air conditioning heat exchanger. As a result, the connection between the air conditioning bypass flow passage and the cooling flow passage which is related to cooling the fuel cell stack can be switched either cooperatively or independently, thereby increasing the degree of freedom of the cooling system. For example, cold coolant can be prevented from flowing to the air conditioning bypass flow passage when the fuel cell stack is cold, and warm coolant can be supplied to the air conditioning heat exchanger after the fuel cell stack has warmed up.

Also, the air conditioning bypass flow passage can be cut off from the cooling flow passage and connected with the circulation flow passage in a closed loop. The air conditioning bypass flow passage can also be cut off from the circulation flow passage and directly connected to the cooling flow passage. The former connection allows coolant to only be circulated between the air conditioning heat exchanger and the heater so the vehicle cabin can be warmed up independently. The latter connection enables the coolant to be cooperatively shared by the coolant flow passage.

Also, the second circulation pump operates more efficiently with a small flow rate than does the first circulation pump. Therefore, when the fuel cell is operating under a low load, the first circulation pump is stopped and coolant is circulated, to the fuel cell stack using the second circulation pump. When the fuel cell stack is operating under a low load, it does not need to be cooled by the radiator so often it is sufficient to circulate the coolant at a low flow rate. In this case, using the second circulation pump uses less power, thereby improving the fuel consumption performance of the overall system.

Also, according to at least one of the foregoing structures, the second heat exchanger uses coolant taken from upstream of the radiator and downstream of the fuel cell stack and returned to downstream of the radiator and upstream of the fuel cell stack. According to this structure, (the amount of coolant flowing through the radiator)+(the amount of coolant flowing through the second heat exchanger)=total amount of coolant=(the amount of coolant flowing through the fuel cell stack). Therefore, a considerable amount of coolant can be supplied to the fuel cell stack.

Also, according to at least one of the foregoing structures, the second heat exchanger uses coolant taken from downstream of the coolant circulation pump and upstream of the fuel cell stack. According to this structure, (the amount of coolant flowing through the radiator)=total amount of coolant=(the amount of coolant flowing through the second heat exchanger)+(the amount of coolant flowing through the fuel cell stack). Therefore, the maximum amount of coolant can be supplied to the radiator.

Also, according to at least one of the foregoing structures, the coolant circulation pump is arranged in series in the cooling flow passage, and the air conditioning heat exchanger uses coolant taken from downstream of the coolant circulation pump and upstream of the fuel cell stack. According to this structure, (the amount of coolant flowing through the radiator)+(the amount of coolant flowing through the second heat exchanger)=total amount of coolant=(the amount of coolant flowing through the fuel cell stack)+(the amount of coolant flowing through the air conditioning heat exchanger). Therefore, coolant can be supplied to the air conditioning heat exchanger while an appropriate amount of coolant is supplied to the fuel cell stack.

Also, according to at least one of the foregoing structures, the coolant circulation pump is arranged in series in the cooling flow passage, and the air conditioning heat exchanger uses coolant taken from downstream of the fuel cell stack and upstream of the radiator. According to this structure, (the amount of coolant flowing through the radiator)+(the amount of coolant flowing through the air conditioning heat, exchanger)+(the amount of coolant flowing through the second heat exchanger)=total amount of coolant=(the amount of coolant flowing through the fuel cell stack). Therefore, coolant can be supplied to other elements while a considerable amount of coolant is supplied to the fuel cell stack.

As described above, the cooling system of the fuel cell according to the invention enables the fuel cell stack cooling system and another heat exchange system to be cooperatively controlled.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
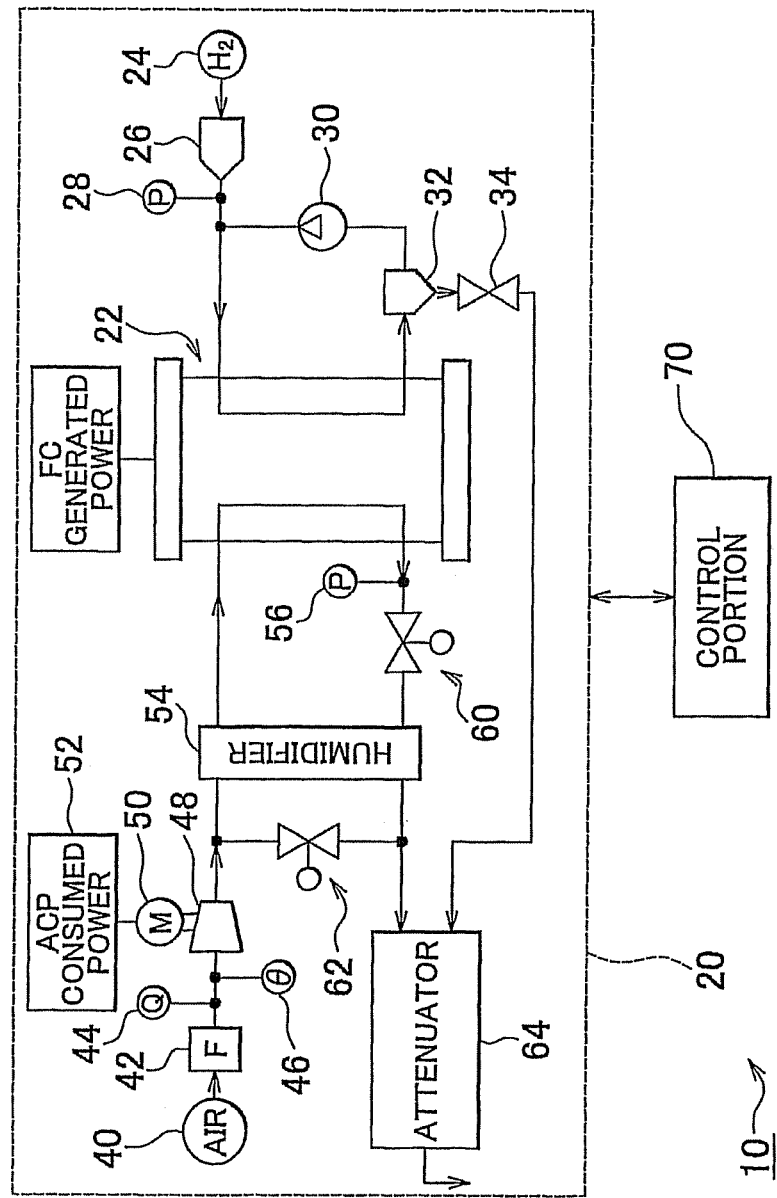
FIG. 1 is a block diagram of a fuel cell operating system to which a cooling system of a fuel cell according to a first embodiment of the invention has been applied.

In the following description and the accompanying drawings, the present invention will be described in more detail in terms of exemplary embodiments. The cooling system of a fuel cell described below is one which is applied to a fuel cell operating system. Therefore, the structure of the fuel cell operating system will be described first and then the cooling system will be described. FIG. 1 is a block diagram of a fuel cell operating system 10 to which a cooling system of a fuel cell according to a first embodiment of the invention has been applied. The fuel cell operating system 10 includes a system main portion 20 and a control portion 70 which controls various elements of the system main portion 20 as the overall system.

The system main portion 20 includes a fuel cell main body referred to as a fuel cell stack 22 which is made up of a plurality of individual fuel cells stacked together, various elements for supplying hydrogen gas that are arranged on an anode side of the fuel cell stack 22, and various elements for supplying air that are arranged on a cathode side of the fuel cell stack 22.

An anode side hydrogen gas supply source 24 is provided which is a tank that supplies hydrogen as a fuel gas. This hydrogen gas supply source is connected to a regulator 26 which serves to appropriately regulate the pressure and flow rate of gas supplied from the hydrogen gas supply source 24. A pressure gauge 28 is provided at an outlet of the regulator 26. This pressure gauge 28 is a measuring machine for detecting the pressure of hydrogen that is supplied. The outlet of the regulator 26 is connected to an anode side inlet of the fuel cell stack 22 such that fuel gas which has been regulated to an appropriate pressure and flow rate is supplied to the fuel cell stack 22.

The gas discharged from the anode side outlet of the fuel cell stack 22 has a low hydrogen content because the hydrogen is consumed to generate electricity, and a high impurity gas content due to nitrogen gas, which is a component in the cathode side air permeating through an MEA (Membrane Electrode Assembly). Water, which is the reaction product, also permeates through the MEA.

A flow diverter 32 which is connected to the anode side outlet of the fuel cell stack 22 diverts discharge gas to an attenuator 64 through a gas release valve 34 when the impurity gas content in the gas discharged from the anode side outlet becomes high. The discharged gas at this time is hydrogen gas that also includes water, which is a reaction product, in addition to nitrogen. Also, a circulation pressure increasing device 30 is provided after the flow diverter 32 and between it and the anode side inlet. This circulation pressure increasing device 30 is a hydrogen pump which increases the partial pressure of hydrogen in the gas returning from the anode side outlet and returns that hydrogen again to the anode side inlet, thereby reusing it.

A cathode side oxygen supply source 40 is actually able to use ambient air. This ambient air (i.e., gas) from the oxygen supply source 40 is supplied to the cathode side through a filter 42. A flow meter 44 is provided after the filter 42 which detects the total flow rate of the gas supplied from the oxygen supply source 40. A temperature gauge 46 is also provided after the filter 42 which detects the temperature of gas flowing out from the oxygen supply source 40.

An air compressor (ACP) 48 increases the pressure of the supply gas by volumetrically compressing it using a motor 50. Also, the ACP (48) varies its speed (i.e., the number of revolutions per minute) under the control of the control portion 70 so as to supply a predetermined amount of supply gas. That is, when a large supply gas flow rate is required, the speed of the motor 50 is increased. Conversely, when a small supply gas flow rate is required, the speed of the motor 50 is decreased. An ACP power consumption detecting portion 52 is provided which is a measuring device that detects the power consumption of the ACP (48), or more specifically, the power consumption of the motor 50. The motor 50 consumes more power the faster it operates and consumes less power the slower it operates. Therefore, the power consumption is closely related to the motor speed or the supply gas flow rate.

Because the ACP (48) supplies air including oxygen to the cathode side of the fuel cell stack 22 under the control of the control portion 70 in this way, air that includes oxygen will hereinafter be referred to as cathode side supply gas or simply supply gas. Therefore, the elements from the oxygen supply source 40 to the ACP (48) can be referred to as oxygen supply devices.

A humidifier 54 appropriately humidifies the supply gas so that the fuel cell reaction in the fuel cell stack 22 takes place efficiently. Supply gas that has been suitably humidified by the humidifier 54 is then supplied to the cathode side inlet of the fuel cell stack 22 and discharged from the cathode side outlet. At this time, water, which is a reaction product, is also discharged together with the discharge gas. The temperature of the fuel cell stack 22 rises due to the reaction, and as it does so, the discharged water turns into water vapor. This water vapor is then supplied to the humidifier 54 and used to appropriately humidify the supply gas. In this way, the humidifier 54 serves to appropriately apply moisture from the water vapor to the supply gas so it can be used as a gas exchanger which uses a so-called in-air system. That is, the humidifier 54 is structured to be able to perform gas exchange between a flow passage through which gas from the ACP (48) flows and a flow passage through which water vapor flows. For example, by making an inside flow passage of the in-air system the flow passage through which supply gas from the ACP (48) flows and making an outside flow passage of the in-air system the flow passage through which water vapor from the cathode side outlet of the fuel cell stack 22 flows, the supply gas to the cathode inlet of the fuel cell stack 22 is able to be appropriately humidified.

Here, the flow passage that connects the oxygen supply devices described above with the cathode side inlet of the fuel cell stack 22 will be referred to as the inlet side flow passage. Correspondingly, the flow passage that is connected from the cathode side outlet of the fuel cell stack 22 to the discharge side will be referred to as the outlet side flow passage.

A pressure gauge 56 provided at the cathode side outlet of the outlet side flow passage detects the gas pressure at the cathode side outlet. Also, a pressure regulating valve 60, also referred to as a back pressure valve, which is provided in the outlet side flow passage adjusts the flow rate of supply gas to the fuel cell stack 22 by regulating the gas pressure at the cathode side outlet. The valve used here is one which can adjust the effective opening of the flow passage such as a butterfly valve for example.

The outlet of the pressure regulating valve 60 is connected to the humidifier 54. Therefore after the gas flows through the pressure regulating valve 60 and supplies water vapor to the humidifier 54, it enters the attenuator 64, after which it is discharged outside the system.

A bypass valve 62 is provided in a bypass flow passage which connects the inlet side flow passage with the outlet side flow passage and is arranged in parallel with the fuel cell stack 22. This bypass valve 62 mainly supplies air for attenuating the hydrogen content in the discharge gas to the attenuator 64. That is, when the bypass valve 62 is opened, supply gas from the ACP (48) is supplied separately from the component flowing to the fuel cell stack 22, to the attenuator 64 via the bypass flow passage without flowing through the fuel cell stack 22. This bypass valve 62 may have the same structure as that of an exhaust bypass valve used to attenuate exhaust gas from an engine. This exhaust gas bypass valve is also referred to as an EGR valve.

The attenuator 64 is a buffer container which collects discharge water containing hydrogen from the anode side gas release valve 34 as well as discharge gas containing not only water vapor from the cathode side but also hydrogen that has leaked through the MEA, makes the hydrogen content appropriate, and then discharges them outside the system. When the hydrogen content exceeds the appropriate level, the bypass valve 62 opens so that attenuation can be performed appropriately using the supply gas provided not via the fuel cell stack 22.

The control portion 70 controls the various elements of the system main portion 20 as an overall system and may also be referred to as the fuel cell CPU. For example, the control portion 70 cooperatively controls the pressure regulating valve and the bypass valve according to the operating state of the fuel cell. The control portion 70 also controls a cooling system, which will be described later, in order to maintain the fuel cell stack 22, the ACP 48, and the cathode side supply gas and the like at the appropriate temperatures. These functions can be realized with software. More particularly, these functions can be realized by executing a corresponding fuel cell operating program, a fuel cell cooling program, and the like. Some of these functions can also be realized with hardware.

In this kind of fuel cell operating system 10, the fuel cell stack 22 generates heat by the reaction between the fuel gas and the supply gas. In addition, heat is also generated by the motor 50 and the like when the ACP (48) is operating. Moreover, the supply gas, supplied to the cathode side of the fuel cell stack 22 is preferably an appropriate temperature. Also, although an air conditioning system for air conditioning the vehicle cabin can be provided, when the fuel cell operating system 10 is mounted in a vehicle, it is preferable to use the waste heat from the fuel cell stack 22, if possible, to quickly bring the cabin to an appropriate temperature when the cabin is cold for example. In this way, the temperature of the elements that make up the fuel cell operating system 10 must be regulated, i.e., cooled, which is why the cooling system of a fuel cell is provided.

In the following description, the cooling flow passage through which coolant flows that cools the fuel cell stack using a radiator will be referred to as the main cooling flow passage and the cooling flow passage which diverts the flow of the coolant and runs parallel to the main cooling flow passage will be referred to as the bypass cooling flow passage. A heat exchanger for cooling the ACP (48) and a heat exchanger used for air conditioning the cabin will be described as heat exchangers provided in the bypass cooling flow passage. The radiator is considered the first heat exchanger so the heat exchanger for cooling the ACP (48) will be referred to as the second heat exchanger and the heat exchanger used for air conditioning the cabin will be referred to as the air conditioning heat exchanger. The second heat exchanger in this case may be combined with an intercooler for independently cooling the ACP (48) as a cooling system by performing heat exchange using diverted coolant. Of course, the intercooler may also be left as an independent cooling system and the second heat exchanger used to cool other elements.

Figure 2:
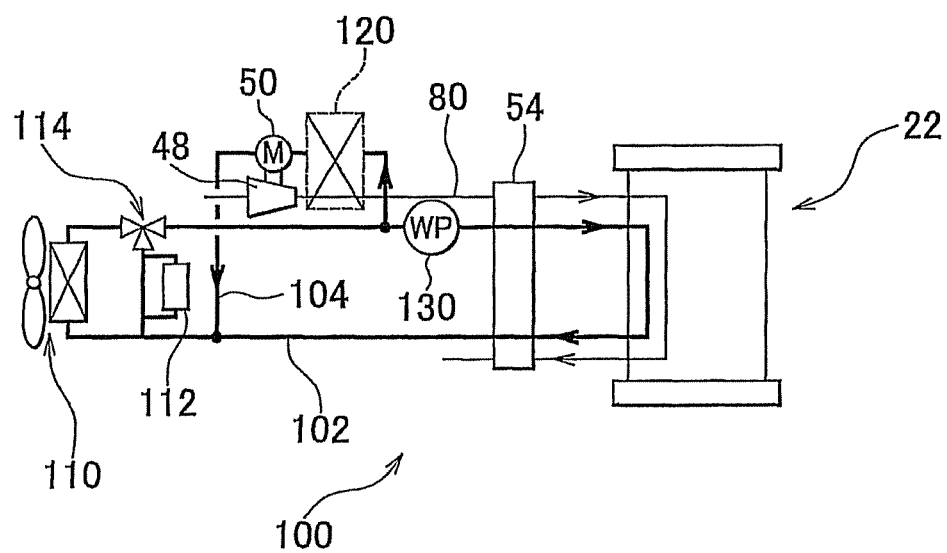
FIG. 2 is a view showing the structure of the cooling system of a fuel cell according to the first embodiment of the invention.

FIG. 2 is a view of the structure of a cooling system 100 of the fuel cell. This drawing shows the cathode side cooling system in the fuel cell operating system. A flow passage 80 for supply gas which enters the fuel cell stack 22 from the ACP (48) via the humidifier 54 and then exits the fuel cell stack 22 is shown by a thin line, while the flow passage through which coolant flows is shown by the bold line. The cooling system 100 of the fuel cell is provided with flow passages through which coolant flows, namely a main cooling flow passage 102 and a bypass cooling flow passage 104 which is arranged parallel with the main cooling flow passage 102 and diverts the same coolant. LCC (Long Life Coolant) or the like which is mainly water can be used for the coolant.

Arranged in the main cooling flow passage 102 are a radiator 110 that has a cooling fan, a heater 112 for heating, a three-way valve 114 for appropriately diverting the coolant to the heater 112, and a circulation pump (WP) for circulating the coolant. Coolant flowing through the main cooling flow passage 102 circulates between the radiator 110 and the fuel cell stack 22, removes heat from the warm or hot fuel cell stack 22, then is cooled by the radiator 110, and returns again to the fuel cell stack 22. Also, the humidifier 54 is arranged parallel to both the fuel cell stack cathode side inlet which supplies oxidizing gas to the cathode side of the fuel cell stack 22 and the fuel cell stack cathode side outlet through which gas is discharged, as is described above, and is also cooled by the main cooling flow passage 102.

The bypass cooling flow passage 104 is arranged parallel to the main cooling flow passage 102. Coolant in this bypass cooling flow passage 104 is taken from the supply side flow passage of the main cooling flow passage 102 through which coolant flows from the radiator 110 towards the fuel cell stack 22, and returned to the discharge side flow passage of the main cooling flow passage 102 through which coolant flows from the fuel cell stack 22 towards the radiator 110. The bypass cooling flow passage 104 leads to a case and the like of the motor 50 of the ACP (48) via a second heat exchanger 120 which performs heat exchange with the flow passage 80 of compressed supply gas supplied from the ACP (48) to the humidifier 54 and the fuel cell stack 22 and then returns to the main cooling flow passage 102. Accordingly, the second heat exchanger 120 removes heat from the motor 50 of the ACP (48) and also regulates the temperature of the supply gas. This function can also be executed by an independent cooling system referred to as an intercooler, but in the structure shown in FIG. 2, the function of the intercooler is shared by the coolant and the cooling system that extends from the radiator 110 to the fuel cell stack 22.

Here, the circulation pump 130 is provided in the supply side flow passage of the main cooling flow passage 102 on the upstream side of the humidifier and the downstream side of location where coolant enters the bypass coolant flow passage 104. As is shown in FIG. 2, the humidifier 54 is arranged downstream of the circulation pump 130 and upstream of the fuel cell stack 22, and coolant used by the heat exchanger 120 is taken from downstream of the radiator 110 and upstream of the circulation pump 130. That is, the coolant flows through the radiator 110 and the second heat exchanger 120 upstream of the circulation pump 130 and through the humidifier 54 and the fuel cell stack 22 downstream of the circulation pump 130.

Accordingly, with this structure, (the amount of coolant flowing through the radiator 110)+(the amount of coolant flowing through the second heat exchanger 120)=total amount of coolant=(the amount of coolant flowing through the fuel cell stack 22)+(the amount of coolant flowing through the humidifier 54). Therefore, if (the amount of coolant flowing through the humidifier 54) is small, then a fairly large amount of coolant can be supplied to the fuel cell stack 22. The ratio of the amount of coolant flowing through the humidifier 54 to the amount of coolant flowing through the fuel cell stack 22 can be determined by the percentage of flow passage resistance of the two or the like. For example, if the ratio of (the amount of coolant flowing through the humidifier 54):(the amount of coolant flowing through the fuel cell stack 22)=2:98, then 98% of the total coolant amount can be supplied to the fuel cell stack 22. As a result, when the temperature of the fuel cell stack 22 becomes too high, that heat can be rapidly removed to the radiator 110 side. Also, the ratio of (the amount of coolant flowing through the radiator 110) to (the amount of coolant flowing through the second heat exchanger 120) can also be determined by the percentage of flow passage resistance of these two or the like. Alternatively, the amount of coolant flowing through these can be determined using a control valve that controls the distribution ratio and the radiator 110 and the second heat exchanger 120 can be cooperatively operated.

Also the bypass cooling flow passage 104 is provided parallel with the main cooling flow passage 102 which enables the difference between the temperature of the coolant discharged from the second heat exchanger 120 and the temperature of the coolant discharged from the fuel cell stack 22 to be reduced. The former defines the supply gas temperature on the supply gas inlet side of the humidifier 54 and the latter defines the temperature of the supply gas outlet of the humidifier 54. Therefore, the temperature difference between both gas inlet ends of the humidifier 54 can be reduced so damage caused by a difference of temperature between the two ends can be suppressed even if an in-air type structure is used.

Figure 3:
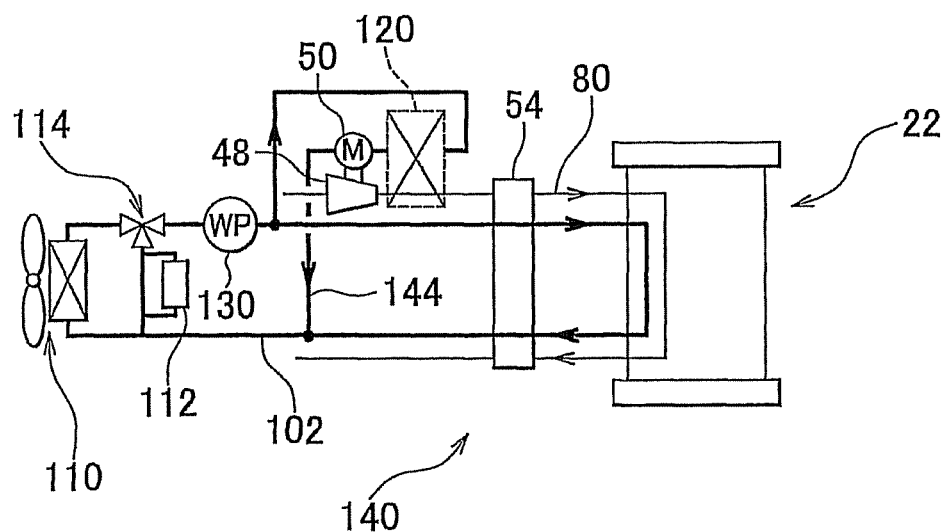
FIG. 3 is a view showing a modified example of the cooling system of a fuel cell according to the first embodiment.

In the cooling system of the fuel cell, the manner in which the coolant is distributed can be changed depending on where the bypass cooling flow passage separates from the main cooling flow passage and the arrangement of the circulation pump 130. FIG. 3 is a view of the structure of a cooling system 140 of a fuel cell which can deliver the largest amount of coolant to the radiator 110 according to a modified example of the first embodiment. Elements in this drawing that are the same as elements in FIG. 2 will be denoted by like reference numerals and detailed descriptions of those elements will be omitted:

In the cooling system 140 of the fuel cell shown in FIG. 3, the circulation pump 130 is provided in the supply side flow passage of the main cooling flow passage 102 downstream of the radiator 110 and upstream of the location where the coolant is diverted to a bypass cooling flow passage 144. As shown in FIG. 3, the humidifier 54 is arranged downstream of the circulation pump 130 and upstream of the fuel cell stack 22, and the coolant used by the second heat exchanger 120 is taken from downstream of the radiator 110 and circulation pump 130, and upstream of the humidifier 54. That is, upstream of the circulation pump 130 coolant flows only through the radiator 110, while downstream of the circulation pump 130 coolant flows through the second heat exchanger 120, the humidifier 54, and the fuel cell stack 22.

Therefore, according to this structure, (the amount of coolant flowing through the radiator 110)=total amount of coolant=(the amount of coolant flowing through the second heat exchanger 120)+(the amount of coolant flowing through the fuel cell stack 22)+(the amount of coolant flowing through the humidifier 54) so the (amount of coolant flowing through the radiator 110) can be maximized. As a result, when the temperature difference between the supply gas inlet side and outlet side of the fuel cell stack 22 is large, that temperature difference can be effectively reduced by delivering the maximum amount of coolant from the fuel cell stack 22 to the radiator 110.

Figure 4:
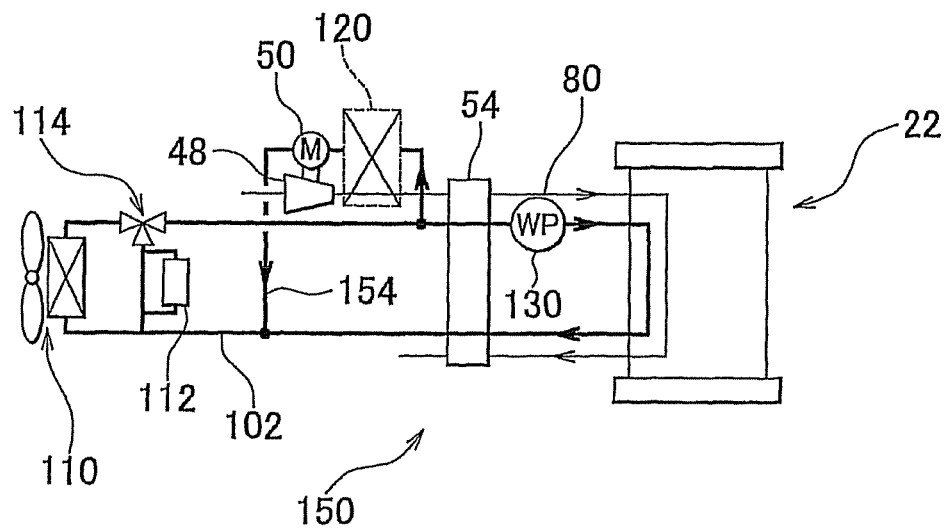
FIG. 4 is a view showing another modified example of the cooling system of a fuel cell according to the first embodiment.

FIG. 4 is a view of the structure of a coolant system 150 of a fuel cell in which the largest amount of coolant can be delivered to the fuel cell stack 22 according to another modified example of the embodiment. Elements in this drawing that are the same as elements in FIGS. 2 and 3 will be denoted by like reference numerals and detailed descriptions of those elements will be omitted.

In the cooling system 150 of the fuel cell shown in FIG. 4, the circulation pump 130 is provided in the supply side flow passage of the main cooling flow passage 102 downstream of the location where the coolant is diverted to a bypass cooling flow passage 144 and the humidifier 54, and immediately upstream of the fuel cell stack 22. As shown in FIG. 4, the humidifier 54 is arranged upstream of the circulation pump 130 and downstream of the radiator 110, and the coolant used by the second heat exchanger 120 is taken from downstream of the radiator 110 and upstream of the humidifier 54. That is, upstream of the circulation pump 130 coolant flows through the radiator 110, the second heat exchanger 120, and the humidifier 54; while downstream of the circulation pump 130 coolant flows only through the fuel cell stack 22.

Therefore, according to this structure, (the amount of coolant flowing through the radiator 110)+(the amount of coolant flowing through the second heat exchanger 120)+(the amount of coolant flowing through the humidifier 54)=total amount of coolant=(the amount of coolant flowing through the fuel cell stack 22) so the (amount of coolant flowing through the fuel cell stack 22) can be maximized. As a result, the heat from the fuel cell stack 22 can be effectively removed by delivering the maximum amount of coolant to that fuel cell stack 22.

Figure 5:
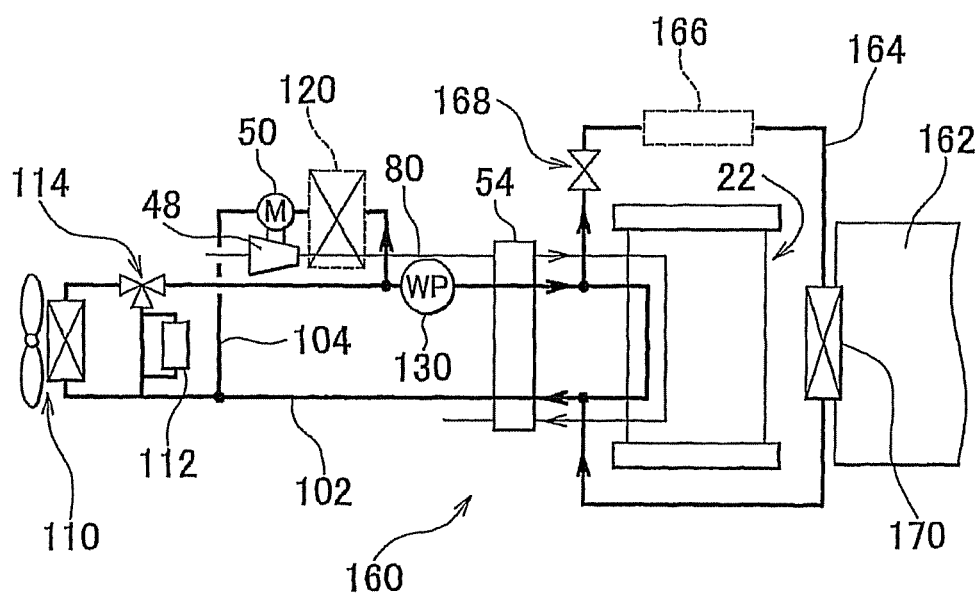
FIG. 5 is a view illustrating cooperative control with an air conditioning heat exchanger according to a second embodiment of the invention.

In the cooling system of a fuel cell, the coolant can also be diverted from the main cooling flow passage to an air conditioning heat exchanger for air conditioning a vehicle cabin. FIG. 5 is a view of the structure of a cooling system 160 of a fuel cell which diverts coolant to an air conditioning heat exchanger according to a second embodiment of the invention. Elements in this drawing that are the same as elements in FIG. 2 will be denoted by like reference numerals and detailed descriptions of those elements will be omitted.

In addition to the cooling system that includes the bypass cooling flow passage 104 and the second heat exchanger 120 described with reference to FIG. 2, the cooling system 160 of a fuel cell shown in FIG. 5 is also provided with an air conditioning bypass cooling flow passage 164 which diverts coolant from the main cooling flow passage 102 to an air conditioning heat exchanger 170 for air conditioning a vehicle cabin 162. In the air conditioning bypass cooling flow passage 164 are provided a heater 166 when necessary, and a shutoff valve 168 which controls (selectively allows or prevents) the diversion of coolant to the air conditioning bypass cooling flow passage 164.

The coolant in the main cooling flow passage 102 is diverted to the air conditioning heat exchanger 170 at a location just before the coolant inlet to the fuel cell stack 22. As shown in FIG. 5, the humidifier 54 is arranged downstream of the circulation pump 130 and upstream of the fuel cell stack 22, and the coolant used by the air conditioning heat exchanger 170 is taken from downstream of the humidifier 54 and upstream of the fuel cell stack 22. Also, when the shutoff valve 168 is open, coolant that has been diverted from the main cooling flow passage 120 is supplied to the air conditioning heat exchanger 170 via the heater 166 and then returned to the main cooling flow passage 102. The coolant return is located immediately after the coolant outlet of the fuel cell stack 22.

According to this structure, (the amount of coolant flowing through the radiator 110)+(the amount of coolant flowing through the second heat exchanger 120)=total amount of coolant=(the amount of coolant flowing through the humidifier 54)+(the amount of coolant flowing through the fuel cell stack 22)+(the amount of coolant flowing, through the air conditioning heat exchanger 170). Therefore, coolant can supplied to the air conditioning heat exchanger while an appropriate amount of coolant is also supplied to the fuel cell stack 22.

That is, according to this structure; coolant which has been heated by operation of the fuel cell stack 22 and circulated while being maintained at an appropriate temperature by the radiator 110 can be supplied to the air conditioning heat exchanger 170 so that the vehicle cabin 162 can be heated and an appropriate air conditioned environment achieved without having to specially provide a separate air conditioning system. If necessary, the heater 112 or the heater 166 may also be used. Further, when the fuel cell stack 22 is not sufficiently warmed up, cold coolant can be prevented from being delivered to the air conditioning heat exchanger 170 by closing the shutoff valve 168.

In this way, by opening the shutoff valve 168 only when the vehicle cabin needs to be heated, the power of the circulation pump 130 can be reduced. Also, by providing the heater 166 which helps to heat the vehicle cabin in the system of the air conditioning heat exchanger 170, as shown in FIG. 5, fuel consumption can be reduced without a pressure loss in the heater 166 during the normal cooling operation of the fuel cell stack 22 in which the shutoff valve 168 is closed.

As described above, by sharing the coolant among the cooling system of the fuel cell stack 22 and the cabin air conditioning system and selectively opening and closing the shutoff valve 168 depending on the temperature of the fuel cell stack 22 and the temperature in the vehicle cabin, the cooling system of the fuel cell stack 22 and the cabin air conditioning system can be combined under cooperative control. In FIG. 5, the bypass cooling flow passage 104 which includes the second heat exchanger 120 is provided, and the radiator 110, the second heat exchanger 120, and the air conditioning heat exchanger 170 are cooperatively controlled. Alternatively, however, the second heat exchanger 120 may be omitted and cooperative control may be performed between the radiator 110 and the air conditioning heat exchanger 170.

Figure 6:
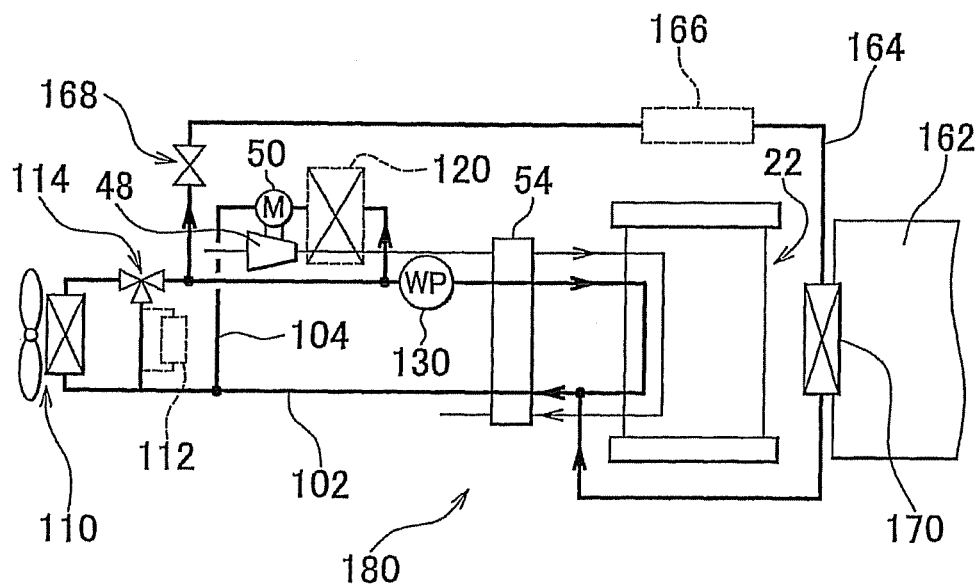
FIG. 6 is a view showing a modified example of cooperative control with an air conditioning heat exchanger according to the second embodiment.

In the cooling system that includes the air conditioning heat exchanger, the manner in which the coolant is distributed can be changed depending on where the air conditioning bypass cooling flow passage separates from the main cooling flow passage and the arrangement of the circulation pump 130. FIG. 6 is a view of the structure of a cooling system 180 of a fuel cell according to a modified example of the second embodiment. In this system, coolant in the main cooling flow passage 102 is diverted to the air conditioning heat exchanger 170 immediately after the radiator 110. Elements in this drawing that are the same as elements in FIG. 5 will be denoted by like reference numerals and detailed descriptions of those elements will be omitted.

In the cooling system 180 of a fuel cell shown in FIG. 6, the coolant in the main cooling flow passage is diverted to the air conditioning heat exchanger 170 immediately downstream of the radiator 110. As shown in the drawing, the humidifier 54 is arranged downstream of the circulation pump 130 and upstream of the fuel cell stack 22, and the coolant used by the air conditioning heat exchanger 170 is taken from downstream of the radiator 110 and upstream of the circulation pump 130. Also, when the shutoff valve 168 is open, coolant that has been diverted from the main cooling flow passage 102 is supplied to the air conditioning heat exchanger 170 via the heater 166 and then returned to the main cooling flow passage 102. The coolant return is located immediately after the coolant outlet of the fuel cell stack 22.

According to this structure, (the amount of coolant flowing through the radiator 110)+(the amount of coolant flowing through the air conditioning heat exchanger 170)+(the amount of coolant flowing through the second heat exchanger 120)=total amount of coolant=(the amount of coolant flowing through the humidifier 54)+(the amount of coolant flowing through the fuel cell stack 22). Therefore, coolant can be supplied to other elements while a considerable amount of coolant is also supplied to the fuel cell stack 22.

That is, according to this structure, coolant which has been heated by operation of the fuel cell stack 22 and circulated while being maintained at an appropriate temperature by the radiator 110 can be supplied to the air conditioning heat exchanger 170 so that the vehicle cabin 162 can be heated and an appropriate air conditioned environment achieved without having to specially provide a separate air conditioning system. If necessary, the heater 112 or the heater 166 may also be used. Further, when the fuel cell stack 22 is not sufficiently warmed up, cold coolant can be prevented from being delivered to the air conditioning heat exchanger 170 by closing the shutoff valve 168. Because a considerable amount of coolant can be supplied to the fuel cell stack 22, heat can be quickly removed from that fuel cell stack 22.

As described above, in the cooling system of a fuel cell stack, the manner in which the coolant is distributed can be changed depending on where the bypass cooling flow passage for the second heat exchanger and the air conditioning bypass cooling flow passage for the air conditioning heat exchanger separate from the main cooling flow passage, as well as the arrangement of the circulation pump. Therefore, by switching the location where the flow is diverted from the main cooling flow passage and the positional arrangement of the circulation pump, the cooling of the fuel cell stack, the heat exchange of the supply gas and the ACP (48) by the second heat exchanger, and the air conditioning of the vehicle cabin by the air conditioning heat exchanger and the like can be cooperatively controlled so that the appropriate amounts of coolant for each can be supplied according to the operating state of the fuel cell operating system 10 or the operating state of the vehicle.

For example, providing the bypass location switching means for switching the location in the main cooling flow passage of the inlet and outlet of the bypass flow passage which diverts coolant from the main cooling flow passage to the second heat exchanger enables a coolant amount appropriate for the operating state of the fuel cell stack to be provided to the fuel cell stack by switching the bypass location depending on the operating state of the fuel cell stack.

Also, providing the bypass location switching means for switching the location in the main cooling flow passage of the inlet and outlet of the bypass flow passage which diverts coolant from the main cooling flow passage to the air conditioning heat exchanger enables a coolant amount appropriate for the vehicle cabin temperature to be supplied to the air conditioning heat exchanger by switching the bypass location depending on the cabin temperature and the like.

Figure 7:
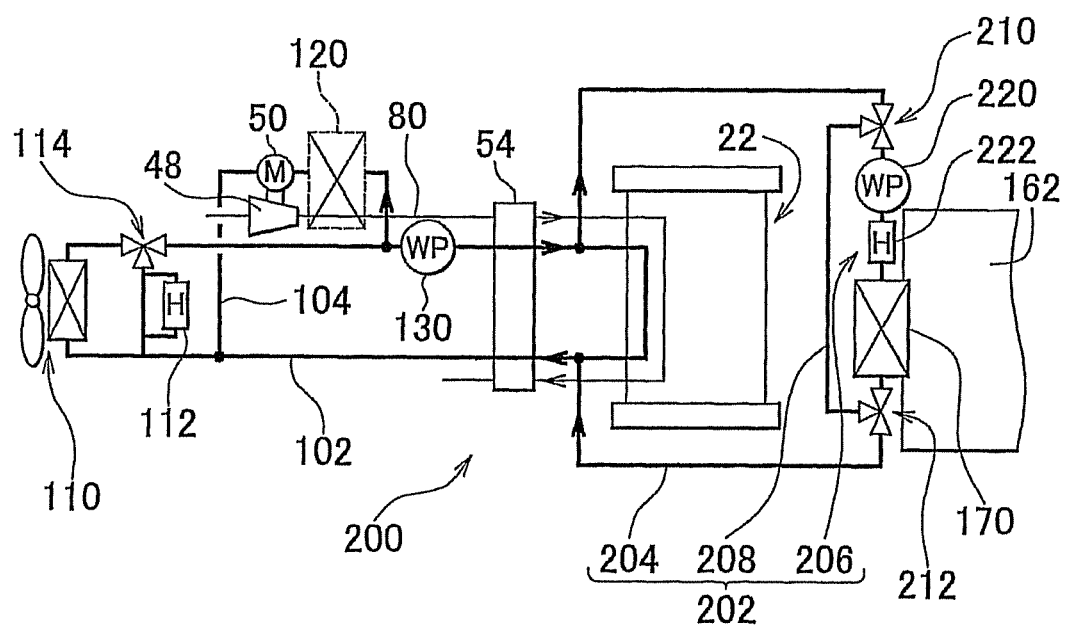
FIG. 7 is a view showing yet another modified example of cooperative control with an air conditioning heat exchanger according to the second embodiment.

FIG. 7 is a view of the structure of a cooling system 200 of a fuel cell according to a modified example of the second embodiment. Here, the structure of the air conditioning bypass cooling flow passage has been devised such that the coolant flowing to the air conditioning heat, exchanger 170 can either be cooperatively shared with the main cooling flow passage 102 or used only for the air conditioning heat exchanger 170. Elements in this drawing that are the same as elements in FIG. 5 and the like will be denoted by like reference numerals and detailed descriptions of those, elements will be omitted.

In the cooling system 200 of a fuel cell shown in FIG. 7, an air conditioning bypass cooling flow passage 202 includes three elements. That is, the entire air conditioning bypass cooling flow passage 202 is made up of an input/output flow passage 204 through which coolant is taken from and returned to the main cooling flow passage 102, an air conditioning bypass flow passage 206 through which coolant that flows through the air conditioning heat exchanger 170 flows, and a circulation flow passage 208 which is arranged parallel to the air conditioning bypass flow passage 206.

As shown in FIG. 7, three-way valves 210 and 212 are provided at the connecting points of the three flow passages, i.e., the input/output flow passage 204, the air conditioning bypass flow passage 206, and the circulation flow passage 208. Thus, the connections between the input/output flow passage 204, the air conditioning bypass flow passage 206, and the circulation flow passage 208 can be switched by the two three-way valves 210 and 212. In this sense, the two three-way valves 210 and 212 are switching means for switching the connection between the air conditioning bypass flow passage 206 and the input/output flow passage 204 which is connected to the main cooling flow passage 102, and the connection between the air conditioning bypass flow passage 206 and the circulation flow passage 208. Several switching modes will be described later.

A pump for circulating coolant other than the circulation pump 130 provided in the main cooling flow passage 102 is provided in the air conditioning bypass flow passage 206. In order to distinguish this pump from the circulation pump 130, it will be referred to as the second circulation pump 220. In the air conditioning bypass. flow passage 206, this second circulation pump 220, a heater 222, and the air conditioning heat exchanger 170 are arranged in series. In FIG. 7, the elements are arranged in the following order: the three-way valve 210, the second circulation pump 220, the heater 222, the air conditioning heat exchanger 170, and the three-way valve 212. Alternatively, however, the various elements may be arranged between the three-way valves 210 and, 212 in another order, and depending on the case, further include a switching valve or the like and be arranged in parallel.

The second circulation pump 220 is a coolant circulation pump that is smaller than the circulation pump 130 in the main cooling flow passage 102. The circulation pump 130 in the main cooling flow passage 102 has a capacity that allows it to operate sufficiently even with a large flow rate so that coolant can be circulated through the coolant flow passage that includes the radiator 110, the humidifier 54, and the fuel cell stack 22, quickly perform heat exchange, and be maintained at an appropriate temperature. In contrast, the second circulation pump 220 is designed to circulate coolant mainly through the air conditioning heat exchanger 170, and therefore can be a small capacity pump. Because this second circulation pump 220 is small, the operating efficiency with a low flow rate is better than that of the circulation pump 130 in the main cooling flow passage 102. Also, the second circulation pump 220 is preferably such that coolant is able to pass through it even when it is not being operated. This enables a decrease in the coolant flow efficiency to be prevented even when the second circulation pump 220 is not being operated.

The input/output flow passage 204 is a coolant flow passage that extends from the main cooling flow passage 102 to the three-way valves 210 and 212, so in this sense it can be considered a branch flow passage of part of the main cooling flow passage 102. The circulation flow passage 208 forms a looped flow passage because it is connected in parallel with the air conditioning bypass flow passage 206.

Figure 8:
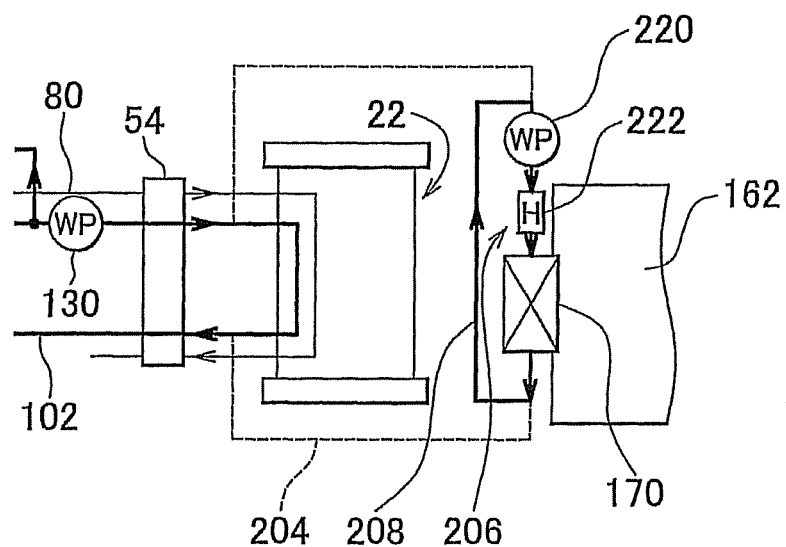
FIG. 8 is a view showing an example of an air conditioning bypass flow passage connection in the modified example shown in FIG. 7.

Next, the switching of the cooling flow passages by the three-way valves 210 and 212 will be described. The switching operation of the three-way valves 210 and 212 is performed by a cooling control portion, not shown, according to the operating state of the fuel cell stack 22. The cooling control portion may also be combined with the control portion 70 of the fuel cell, operating system 10 shown in FIG. 1. FIG. 8 is a view showing the air conditioning bypass flow passage 206 connected to the circulation flow passage 208 in a closed loop which is achieved by switching the three-way valves 210 and 212. At this time, the input/output flow passage 204 is closed off from this closed loop flow passage. To make this flow passage easier to see, the three-way valves 210 and 212 have been omitted in FIG. 8. More specifically, this closed loop flow passage is formed by operating the three-way valve 210 so that it connects one side of the air conditioning bypass flow passage 206 with one side of the circulation flow passage 208, and operating the three-way valve 212 so that it connects the other side of the air conditioning bypass flow passage 206 with the other side of the circulation flow passage 208.

Forming this kind of closed loop flow passage enables coolant to be circulated through the closed loop flow passage by the second circulation pump 220, independently from the main cooling flow passage 102. That is, coolant can be circulated between the heater 222 and the air conditioning heat exchanger 170. This connecting state is preferably used when the fuel cell stack 22 is still operating at a low temperature. As a result, cold coolant that has not yet been heated sufficiently by the fuel cell stack 22 can be prevented from being delivered to the air conditioning heat exchanger 170. Also, operating the heater 222 and the second circulation pump 220 enables coolant in the closed loop flow passage to be sufficiently heated and supplied to the air conditioning heat exchanger 170, which enables the vehicle cabin 162 to be heated both efficiently and quickly.

Figure 9:
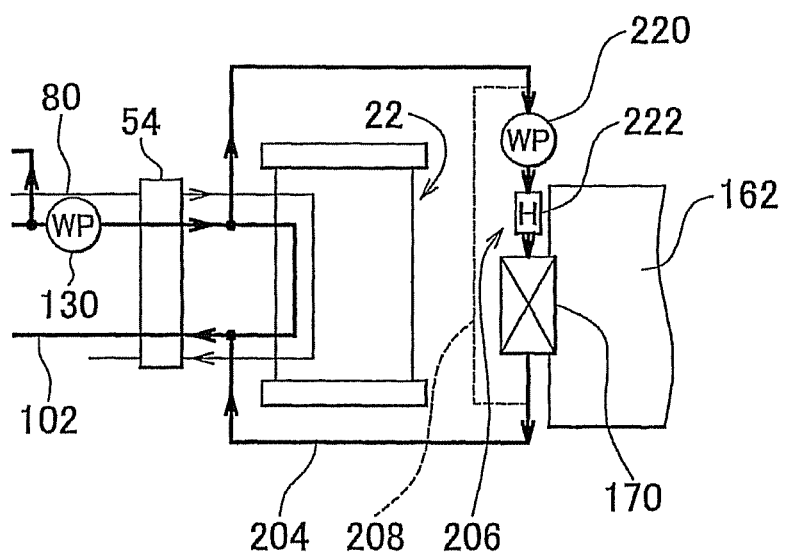
FIG. 9 is a view showing another example of an air conditioning bypass flow passage connection in the modified example shown in FIG. 7.

FIG. 9 is view showing a state in which the three-way valves 210 and 212 have been switched to cut off the circulation flow passage 208 and connect the input/output flow passage 204 and the air conditioning bypass flow passage 206 together. Here as well, just as in FIG. 8, the three-way valves 210 and 212 have been omitted to make the flow passage easier to see. More specifically, the three-way valve 210 is operated so that it connects one side of the input/output flow passage 204 which is connected to the coolant inlet in the main cooling flow passage 102 with one side of the air conditioning bypass flow passage 206, and the three-way valve 212 is operated so that it connects the other side of the air conditioning bypass flow passage 206 with the other side of the input/output flow passage 204 which is connected to the coolant return in the main cooling flow passage 102. As a result, the circulation flow passage 208 is cut off while the input/output flow passage 204 and the air conditioning bypass flow passage 206 are directly connected together so the air conditioning bypass flow passage 206 can be arranged parallel to the main cooling flow passage 102 running through the fuel cell stack 22.

This connection is basically the same as the structure shown in FIG. 5. That is, the air conditioning bypass cooling flow passage 202 shares the coolant with the main cooling flow passage 102 and so-called cooperative control is performed. Therefore, the three-way valves 210 and 212 switch connection of the air conditioning bypass flow passage 206 between a cooperative control connection with the main cooling flow passage 102 and an independent control connection. When the air conditioning bypass flow passage 206 is connected via the cooperative control connection, the second circulation pump 220 is stopped. As described above, however, even when operation of the second circulation pump is stopped, coolant can still pass freely through the second circulation pump 220 so the coolant flow efficiency of the air conditioning bypass flow passage 206 does not decrease.

Cooperative control is performed when coolant which has been heated by operation of the fuel cell stack 22 and maintained at an appropriate temperature by the radiator 110 is circulated, as described with reference to FIG. 5. Therefore, the connection is switched between the closed loop flow passage connection shown in FIG. 8 and the cooperative control connection (the direct connection shown in FIG. 9) depending on the operating state of the fuel cell stack 22. For example, when the fuel cell stack 22 is not yet warmed up, the closed loop flow passage connection shown in FIG. 8 is employed and the heater 222 and the second circulation pump 220 are operated to increase the temperature of the coolant supplied to the air conditioning heat exchanger 170. When the fuel cell stack 22 warms up and the temperature of the coolant in the main cooling, flow passage 102 rises, the connection switches to the direct connection shown in FIG. 9 and the heater 222 stops operating. As a result, the power required to heat the vehicle, cabin 162 can be reduced, thereby improving fuel consumption:

The connection may switch between the closed loop flow passage connection shown in FIG. 8 and the direct connection shown in FIG. 9 when the temperature of the coolant in the fuel cell stack 22, i.e., the coolant temperature, reaches a predetermined target coolant temperature. Alternatively, in order to further improve fuel consumption, the switch may be made even earlier, such as when heat exchange is able to be performed and the coolant temperature reaches 50 degrees Celsius which is near the target coolant temperature.

Figure 10:
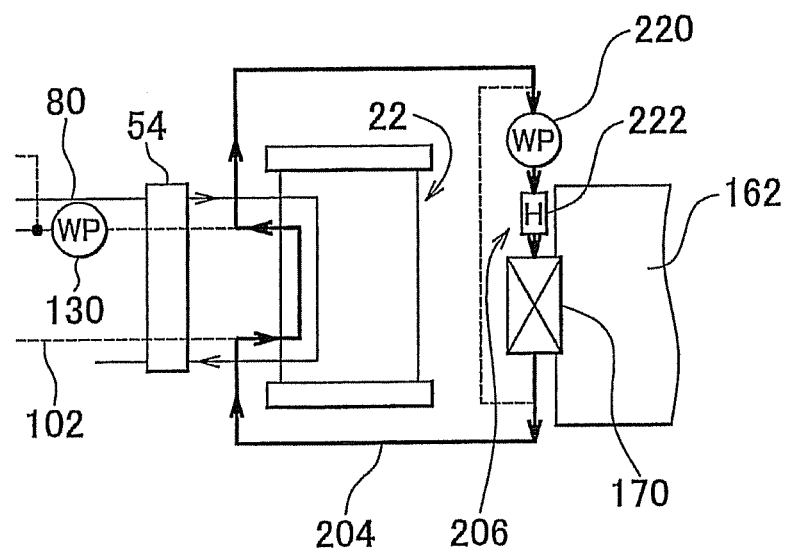
FIG. 10 is a view illustrating operation of a circulation pump in the modified example shown in FIG. 7.

FIG. 10 is a view showing a case in which the second circulation pump 220 is operated and the circulation pump 130 of the main cooling flow passage 102 is stopped when the connection shown in FIG. 9 is established, i.e., when the air conditioning bypass flow passage 206 and the main cooling flow passage 102 are directly connected. Operation of the circulation pump 130 of the main cooling flow passage 102 and the second circulation pump 220 is switched by a cooling control portion, not shown, according to the operating state of the fuel cell stack 22. When the circulation pump 130 of the main cooling flow passage 102 is not being operated, coolant does not circulate through the main cooling flow passage 102. Under these conditions, when the second circulation pump 220 is operated while the connection shown in FIG. 9 is established, coolant is circulated through a closed loop, flowing from the second circulation pump 220 to the heater 222, to the air conditioning heat exchanger 170, to the fuel cell stack 22, and then back again to the second circulation pump 220.

The operating state described above with reference to FIG. 10 may be used when the fuel cell stack 22 is operating under a low load such as when the fuel cell stack 22 is idling or operating intermittently. Because not much heat is generated when the fuel cell stack 22 is operating under a low load, cooling by the radiator 110 is often not necessary. Therefore, the circulation pump 130 of the main cooling flow passage 102 is stopped and coolant is instead circulated by the smaller second circulation pump 220. When the flow rate is low, the second circulation pump 220 operates at better efficiency than does the large capacity circulation pump 130. That is, the smaller second circulation pump 220 is able to efficiently circulate coolant with less power than the large capacity circulation pump 130, which enables the fuel consumption to be improved when the fuel cell stack 22 is operating under a low load. When the fuel cell stack 22 is operating under a medium or high load, the second circulation pump 220 is stopped and the coolant is circulated by operating only the circulation pump 130 of the main cooling flow passage 102, as described with reference to FIG. 9. Accordingly, the power required to drive the second circulation pump 220 can be reduced, which in turn enables fuel consumption at medium and high loads to be improved.

Further, when a user turns the air conditioning in the vehicle cabin 162 off after the coolant was heated using the closed loop flow passage connection shown in FIG. 8 and the vehicle cabin 162 warmed by the air conditioning heat exchanger 170, the connection switches to the direct connection shown in FIG. 9 or 10 while the heater 222 continues to operate. When the air conditioner is turned off, a fan and the like which blows warm air from the air conditioning heat exchanger 170 into the vehicle cabin 162 also turns off. Because the heater 222 is still operating, however, heated coolant can be supplied to the fuel cell stack 22, thus enabling the fuel cell stack 22 to warm up quickly.

In FIGS. 5 to 10, the coolant flow passage that includes the air conditioning heat exchanger 170 is preferably insulated by appropriate heat insulating means. For example, a coolant flow passage pipe can be covered with an appropriate heat insulating material. As a result, heat exchange in the air conditioning heat exchanger 170 can be performed efficiently when the fuel cell operating system is started up so the vehicle cabin 162 can be warmed up quickly. Thus, the vehicle cabin 162 can be warmed up quickly using little power and the like, thereby improving fuel consumption.

The structure described above is one in which the main cooling flow passage 102 passes through the humidifier 54. However, the structure may also be such that the main cooling flow passage 102 does not pass through the humidifier 54.

Also, the coolant inlet and coolant return for the second heat exchanger 120 in the main cooling flow passage 102 may be reversed from the structure described above such that coolant flows from the motor 50 toward the second heat exchanger 120. Also the coolant inlet and coolant, return for the air conditioning heat exchanger 170 in the main cooling flow passage 102 may also be reversed from the structure described above. Such a structure will now be described. Hereinafter, elements that are the same as those in FIGS. 1 to 10 will be denoted by like reference numerals and detailed descriptions of those elements will be omitted.

Figure 11:
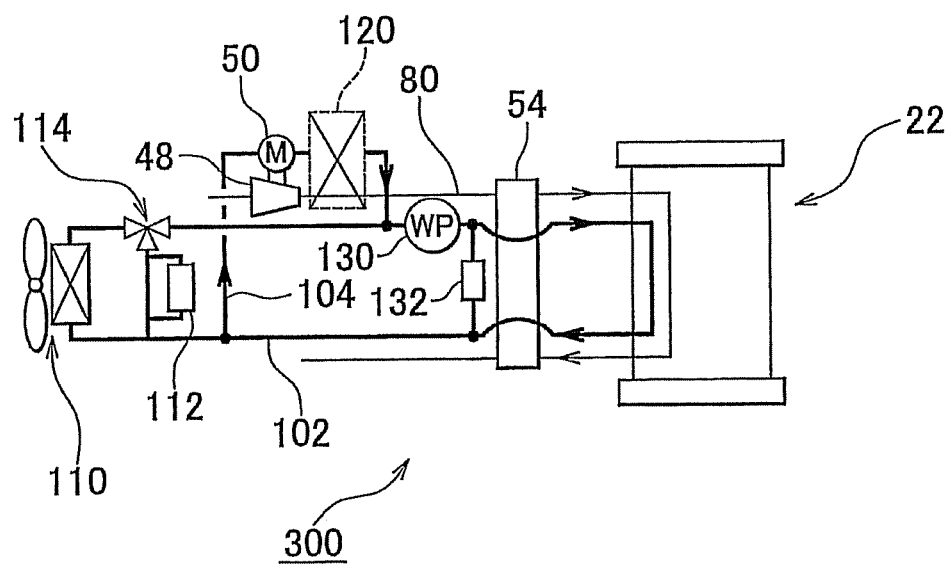
FIG. 11 is a view showing the structure of a cooling system of a fuel cell according to another embodiment.

FIG. 11 is a view of the structure of a cooling system 300 of a fuel cell. This coolant system 300 of a fuel cell differs from the coolant system 100 of a fuel cell described with reference to FIG. 2 in that the main cooling flow passage 102 does not pass through the humidifier 54 and the coolant inlet and coolant return for the second heat exchanger 120 in the main cooling flow passage 102 are reversed. Here, in the same way as described with reference to FIG. 2, the cooling system 300 of a fuel cell is provided with flow passages through which coolant flows, namely the main cooling flow passage 102 and a bypass cooling flow passage 104 which is arranged in parallel with this main cooling flow passage 102 and diverts the same coolant.

Arranged in the main cooling flow passage 102 are the radiator 110 that has the cooling fan, the heater 112 for heating, the three-way valve 114 for appropriately diverting the coolant to the heater 112, and the circulation pump (WP) 130 for circulating the coolant. Coolant flowing through the main cooling flow passage 102 circulates between the radiator 110 and the fuel cell stack 22, removing heat from the warm or hot fuel cell stack 22, then being cooled by the radiator 110, and returning again to the fuel cell stack 22. Also, the humidifier 54 is arranged parallel to both the gas inlet which supplies oxidizing gas to the cathode side of the fuel cell stack 22 and the gas outlet through which gas is discharged, as is described above. The main cooling flow passage 102 does not pass through the humidifier 54, however, so the humidifier 54 is not cooled by the coolant from the main cooling flow passage 102.

An ion exchanger 132 in FIG. 11 is an apparatus that functions to remove ions in the coolant that serves as the cooling medium. That is, ions from elements that make up the coolant circulation passage dissolve in the coolant. The ion exchanger 132 removes these ions, thereby keeping the resistance of the coolant that serves as the cooling medium high. The ion exchanger 132 is arranged in parallel with the main cooling flow passage 102, as shown in FIG. 11, but it may also be arranged in series with the main cooling flow passage 102 depending on the situation. Also, ion detecting means for detecting the ion content in the coolant may also be provided in the ion exchanger 132.

The bypass cooling flow passage 104 is arranged in parallel with this main cooling flow passage 102. Coolant is taken into this bypass cooling flow passage 104 from the discharge side flow passage of the main cooling flow passage 102 through which coolant returns from the fuel cell stack 22 to the radiator 110, and is returned to the supply side flow passage of the main cooling flow passage 102 through which coolant flows from the radiator 110 towards the fuel cell stack 22. The bypass cooling flow passage 104 leads to the second heat exchanger 120 of the ACP 48, where heat exchange is performed with the flow passage 80 for compressed supply gas supplied from the ACP 48 to the fuel cell stack 22 via the humidifier 54, after which the coolant is returned to the main cooling flow passage 102. Accordingly, the second heat exchanger 120 regulates the temperature of the supply gas.

This function is conventionally performed by an independent cooling system referred to as an intercooler, but in the structure shown in FIG. 11, similar to FIG. 2, the function of the conventional intercooler is shared by the coolant and the cooling system that extends from the radiator 110 to the fuel cell stack 22.

Here, the circulation pump 130 is provided in the supply side flow passage of the main cooling flow passage 102 on the downstream side of location where coolant returns from the bypass coolant flow passage 104 to the main cooling flow passage 102. As is shown in FIG. 11, the coolant that flows through the second heat exchanger 120 is taken from upstream of the radiator 110 and downstream of the fuel cell stack 22. That is the coolant flows through the radiator 110 and the second heat exchanger 120 upstream of the circulation pump 130 and through the fuel cell stack 22 downstream of the circulation pump 130.

Accordingly, with this, structure, (the amount of coolant flowing through the radiator 110)+(the amount of coolant flowing through the second heat exchanger 120)=total amount of coolant=(the amount of coolant flowing through the fuel cell stack 22). Therefore, a fairly large amount of coolant can be supplied to the fuel cell stack 22. As a result, when the temperature of the fuel cell stack 22 is too high, that heat can be quickly removed to the radiator 110 side. Also, the ratio of (the amount of coolant flowing through the radiator 110) to (the amount of coolant flowing through the second heat exchanger 120) can be determined by the percentage of flow passage resistance of the two or the like. Alternatively, the amount of coolant flowing through these can be determined using a control valve that controls the distribution ratio and the radiator 110 and the second heat exchanger 120 can be cooperatively operated.

Also, the bypass cooling flow passage 104 is provided parallel with the main cooling flow passage 102 which enables the difference between the temperature of the coolant discharged from the second heat exchanger 120 and the temperature of the coolant discharged from the fuel cell stack 22 to be reduced. The former is defined by the supply gas temperature on the supply gas inlet side of the humidifier 54 and the latter is defined by the gas temperature at the supply gas outlet side of the humidifier 54. Therefore, the temperature difference between both gas inlet ends of the humidifier 54 can be reduced so damage caused by a pressure difference between the two ends can be suppressed even if an in-air type structure is used.

Figure 12:
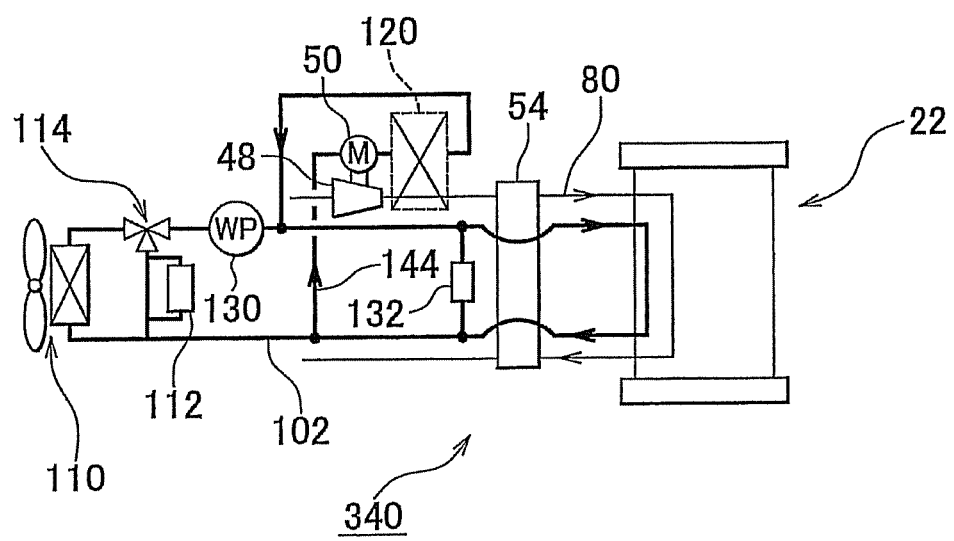
FIG. 12 is a view showing yet another embodiment.

In the cooling system of the fuel cell, the manner in which the coolant is distributed can be changed depending on where the bypass cooling flow passage separates from the main cooling flow passage and the arrangement of the circulation pump 130. FIG. 12 is a view of the structure of a cooling system 340 of a fuel cell which can deliver the largest amount of coolant to the radiator 110.

In the cooling system 340 of the fuel cell shown in FIG. 12, the circulation pump 130 is provided in the supply side flow passage of the main cooling flow passage 102 downstream of the radiator 110 and upstream of the location where the coolant is returned to the main cooling flow passage 102 from the bypass cooling flow passage 144. As shown in FIG. 12, the coolant used in the second heat exchanger 120 is taken from upstream of the radiator 110, and downstream of the fuel cell stack 22. That is, upstream of the circulation pump 130 coolant flows only through the radiator 110, while downstream of the circulation pump 130 coolant flows through the second heat exchanger 120 and the fuel cell stack 22.

Therefore, according to this structure, (the amount of coolant flowing through the radiator 110)=total amount of coolant=(the amount of coolant flowing through the second heat exchanger 120)+(the amount of coolant flowing through the fuel cell stack 22) so the (amount of coolant flowing through the radiator 110) can be maximized. As a result, when the temperature difference between the supply gas inlet side and outlet side of the fuel cell stack 22 is large, for example, that temperature difference can be effectively reduced by delivering the maximum amount of coolant from the fuel cell stack 22 to the radiator 110.

Figure 13:
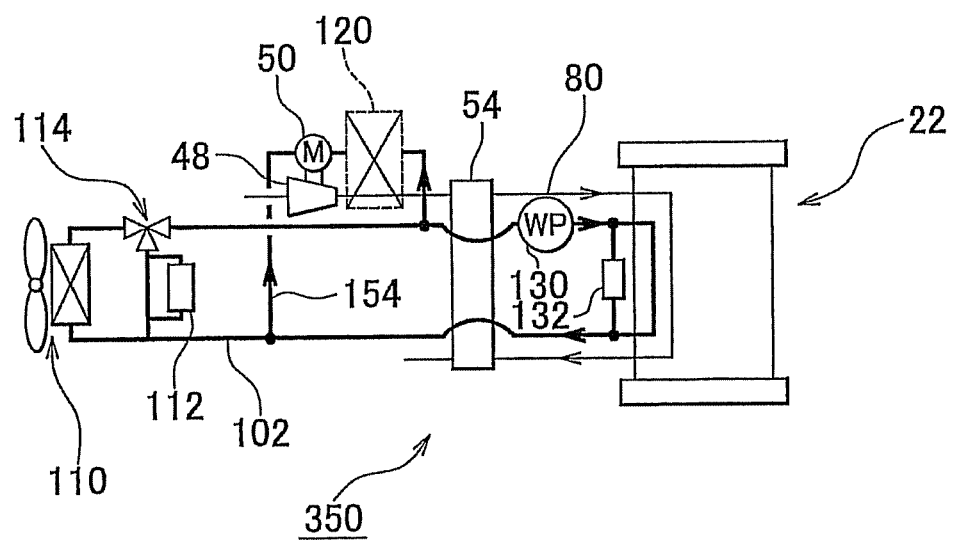
FIG. 13 is a view showing still another embodiment.

FIG. 13 is a view showing the structure of the cooling system 350 of a fuel cell which can deliver the largest amount of coolant to the fuel cell stack 22.

In the cooling system 350 of the fuel cell shown in FIG. 13, the circulation pump 130 is provided in the supply side flow passage of the main cooling flow passage 102 downstream of the location where the coolant returns from a bypass cooling flow passage 154 and immediately upstream of the fuel cell stack 22. As shown in FIG. 13, the coolant used in the second heat exchanger 120 is taken from upstream of the radiator 110 and downstream of the fuel cell stack 22. That is, upstream of the circulation pump 130 coolant flows through the radiator 110 and the second heat exchanger 120, while downstream of the circulation pump 130 coolant flows only through the fuel cell stack 22.

Therefore, according to this structure, (the amount of coolant flowing through the radiator 110)+(the amount of coolant flouting through the second heat exchanger 120)=total amount of coolant=(the amount of coolant flowing through the fuel, cell stack 22) so the (amount of coolant flowing through the fuel cell stack 22) can be maximized. As a result, heat from the fuel cell stack 22 can be efficiently removed by delivering the maximum amount of coolant to the fuel cell stack 22.

Figure 14:
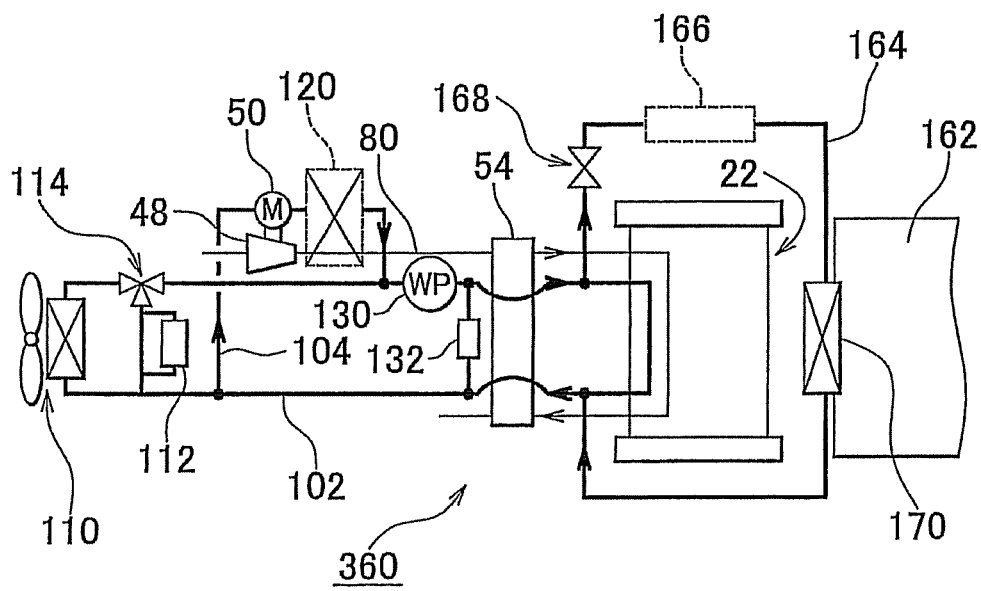
FIG. 14 is a view showing another embodiment of coordinated control with the air conditioning heat exchanger.

In the cooling system of a fuel cell, the coolant can also be diverted from the main cooling flow passage to the air conditioning heat exchanger for air conditioning the vehicle cabin. FIG. 14 is a view of the structure of a cooling system 360 of a fuel cell which diverts coolant to the air conditioning heat exchanger.

In addition to the cooling system that includes the bypass cooling flow passage 104 and the second heat exchanger 120 described with reference to FIG. 11, the cooling system 360 of a fuel cell shown in FIG. 14 is also provided with the air conditioning bypass cooling flow passage 164 which diverts coolant from the main cooling flow passage 102 to the air conditioning heat exchanger 170 for air conditioning the vehicle cabin 162. In the air conditioning bypass cooling flow passage 164 are provided the heater 166 when necessary, and the shutoff valve 168 which controls (selectively allows or prevents) the diversion of coolant to the air conditioning bypass cooling flow passage 164.

The coolant in the main cooling flow passage 102 is diverted to the air conditioning heat exchanger 170 at a location just before the coolant inlet to the fuel cell stack 22. As shown in FIG. 14, the coolant used in the air conditioning heat exchanger 170 is taken from upstream of the fuel cell stack 22. Also, when the shutoff valve 168 is open, coolant that has been diverted from the main cooling flow passage 102 is supplied to the air conditioning heat exchanger 170 via the heater 166 and then returned to the main cooling flow passage 102. The coolant return is located immediately after the coolant outlet of the fuel cell stack 22.

According to this structure, (the amount of coolant flowing through the radiator 110)+(the amount of coolant flowing through the second heat exchanger 120)=total amount of coolant=(the amount of coolant flowing through the fuel cell stack 22)+(the amount of coolant flowing through the air conditioning heat exchanger 170). Therefore, coolant can be supplied to the air conditioning heat exchanger while an appropriate amount of coolant is also supplied to the fuel cell stack 22.

That is, according to this structure, coolant which has been heated by operation of the fuel cell stack 22 and circulated while being maintained at an appropriate temperature by the radiator 110 can be supplied to the air conditioning heat exchanger 170 so that the vehicle cabin 162 can be heated and an appropriate air conditioned environment achieved without having to specially provide separate air conditioning system. If necessary, the heater 112 or the heater 166 may also be used. Further, when the fuel cell stack 22 is not sufficiently warmed up, cold coolant can be prevented from being delivered to the air conditioning heat exchanger 170 by closing the shutoff valve 168.

In this way, by opening the shutoff valve 168 only when the vehicle cabin needs to be heated, the power of the circulation pump 130 can be reduced. Also, by providing the heater 166 which helps to heat the vehicle cabin in the system of the air conditioning heat exchanger 170, as shown in FIG. 14, fuel consumption can be reduced without a pressure loss in the heater 166 during the normal cooling operation of the fuel cell stack 22 in which the shutoff valve 168 is closed.

As described above, by sharing the coolant among the cooling system of the fuel cell stack 22 and the cabin air conditioning system and by selectively opening and closing the shutoff valve 168 depending on the temperature of the fuel cell stack 22 and the temperature in the vehicle cabin, the cooling system of the fuel cell stack 22 and the cabin air conditioning system can be combined under cooperative control. In FIG. 14, the bypass cooling flow passage 104 which includes the second heat exchanger 120 is provided, and the radiator 110, the second heat exchanger 120, and the air conditioning heat exchanger 170 are cooperatively controlled. Alternatively, however, the second heat exchanger 120 may be omitted and cooperative control may be performed between the radiator 110 and the air conditioning heat exchanger 170.

Figure 15:
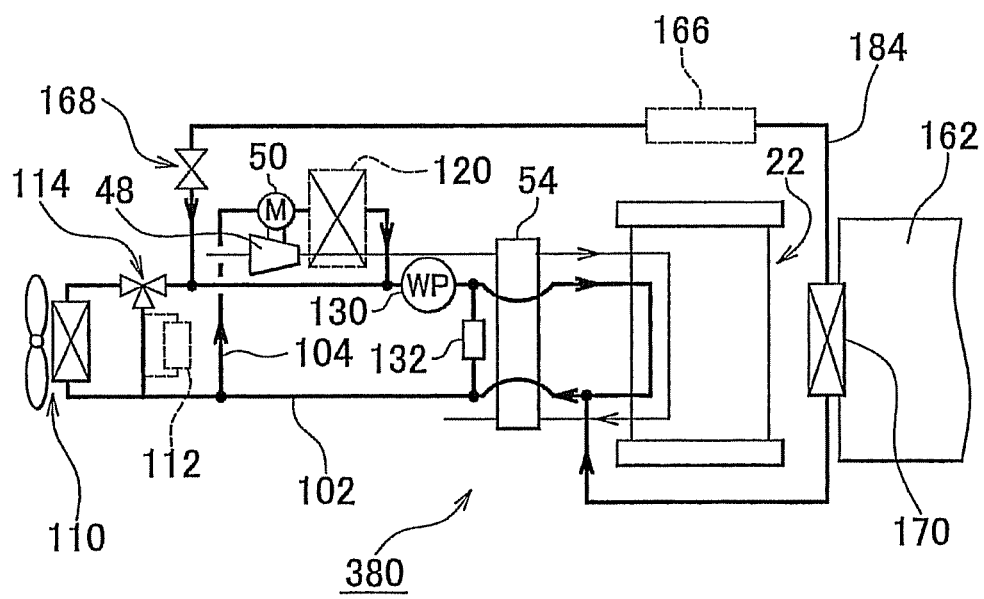
FIG. 15 is a view showing yet another embodiment of coordinated control with the air conditioning heat exchanger.

In the cooling system that includes the air conditioning heat exchanger, the manner in which the coolant is distributed can be changed depending on where the air conditioning bypass cooling flow passage separates from the main cooling flow passage and the arrangement of the circulation pump 130. FIG. 15 is a view of the structure of a cooling system 380 of a fuel cell according to a twelfth example embodiment of the invention. In this system, coolant returns to the main cooling flow passage 102 from the air conditioning heat exchanger 170 immediately after the radiator 110.

In the cooling system 380 of a fuel cell shown in FIG. 15, the coolant in the main cooling flow passage 102 is diverted to the air conditioning heat exchanger 170 downstream of the fuel cell stack 22 and upstream of the radiator 110. As shown in FIG. 15, the coolant used in the air conditioning heat exchanger 170 is taken from immediately downstream of the coolant outlet of the fuel cell stack 22 and upstream of the radiator 110. Also, when the shutoff valve 168 is open, coolant that has been diverted from the main cooling flow passage 102 is supplied to the air conditioning heat exchanger 170 and the heater 166 and then returned to the main cooling flow passage 102. The coolant return is located downstream of the radiator 110 and upstream of the circulation pump 130.

According to this structure, (the amount of coolant flowing through the radiator 110)+(the amount of coolant flowing through the air conditioning heat exchanger 170)+(the amount of coolant flowing through the second heat exchanger 120)=total amount of coolant=(the amount of coolant flowing through the fuel cell stack 22). Therefore, coolant can be supplied to other elements while a considerable amount of coolant is also supplied to the fuel cell stack 22.

That is, according to this structure, coolant which has been heated by operation of the fuel cell stack 22 and circulated while being maintained at an appropriate temperature by the radiator 110 can be supplied to the air conditioning heat exchanger 170 so that the vehicle cabin 162 can be heated and an appropriate air conditioned environment achieved without having to specially provide a separate air conditioning system. If necessary, the heater 166 may also be used. Further, when the fuel cell stack 22 is not sufficiently warmed up, cold coolant can be prevented from being delivered to the air conditioning heat exchanger 170 by closing the shutoff valve 168. Because a considerable amount of coolant can be supplied to the fuel cell stack 22, heat can be quickly removed from that fuel cell stack 22.

As described above, even in the cooling system of a fuel cell stack in which coolant does not flow from the main cooling flow passage through the humidifier 54, the manner in which the coolant is distributed can be changed depending on where the bypass cooling flow passages for the second heat exchanger and the air conditioning bypass cooling flow passage for the air conditioning heat exchanger separate from the main cooling flow passage, as well as the arrangement of the circulation pump. Therefore, by switching the location where the flow is diverted from the main cooling flow passage and the positional arrangement of the circulation pump, the cooling of the fuel cell stack, the heat exchange of the supply gas and the ACP 48 by the second heat exchanger, and the air conditioning of the vehicle cabin by the air conditioning heat exchanger and the like can be cooperatively controlled so that the appropriate amounts of coolant for each can be supplied according to the operating state of the fuel cell operating system 10 or the operating state of the vehicle.

For example, providing the bypass location switching means for switching the location in the main cooling flow passage of the inlet and outlet of the bypass flow passage which diverts coolant from the main cooling flow passage to the second heat exchanger enables a coolant amount appropriate for the operating state of the fuel cell stack to be provided to the fuel cell stack by switching the bypass location depending on the operating state of the fuel cell stack.

Also, providing the bypass location switching means for switching the location in the main cooling flow passage of the inlet and outlet of the bypass flow passage which diverts coolant from the main cooling flow passage to the air conditioning heat exchanger enables a coolant amount appropriate for the vehicle cabin temperature to be supplied to the air conditioning heat exchanger by switching the bypass location depending on the cabin temperature and the like.

Figure 16:
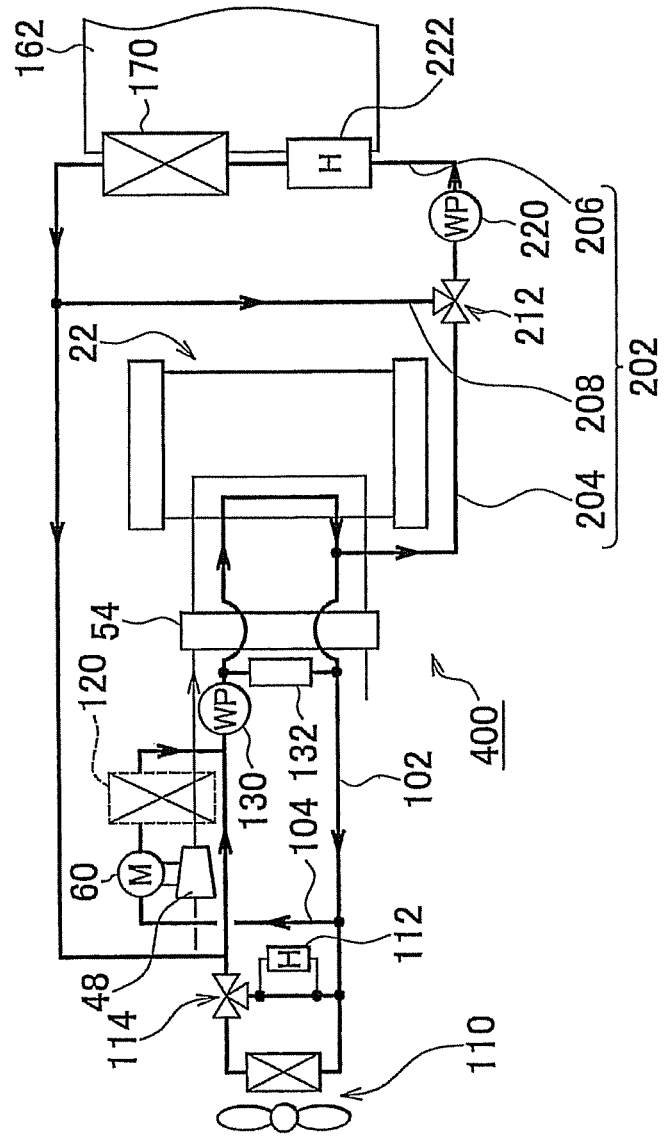
FIG. 16 is a view showing still another embodiment of coordinated control with the air conditioning heat exchanger.

FIG. 16 is a view of the structure of a cooling system 400 of a fuel cell according to a fourteenth example embodiment of the invention. Here, the structure of the air conditioning bypass cooling flow passage has been devised such that the coolant flowing to the air conditioning heat exchanger 170 can either be cooperatively shared with the main cooling flow passage 102 or used only for the air conditioning heat exchanger 170.

In the cooling system 400 of the fuel cell shown in FIG. 16, the air conditioning bypass cooling flow passage 202 includes three elements. That is, the entire air conditioning bypass cooling flow passage 202 is made up of the input/output flow passage 204 through which coolant is taken from and returned to the main cooling flow passage 102, the air conditioning bypass flow passage 206 through which coolant that flows through the air conditioning heat exchanger 170 flows, and the circulation flow passage 208 which is arranged parallel to the air conditioning bypass flow passage 206.

As shown in FIG. 16, a three-way valve 212 is provided at the connecting point of the three flow passages, i.e., the input/output flow passage 204, the air conditioning bypass flow passage 206, and the circulation flow passage 208. Thus, the connection between the input/output flow passage 204, the air conditioning bypass flow passage 206, and the circulation flow passage 208 can be switched by the three-way valve 212. In this sense, the two three-way valve 212 serves as means for switching the connection between the air conditioning bypass flow passage 206 and the input/output flow passage 204 which is connected to the main cooling flow passage 102, and the connection between the air conditioning bypass flow passage 206 and the circulation flow passage 208. Several switching modes will be described later.

A pump for circulating coolant other than the circulation pump 130 provided in the main cooling flow passage 102 is provided in the air conditioning bypass flow passage 206. In order to distinguish this pump from the circulation pump 130, it will be referred to as the second circulation pump 220. In the air conditioning bypass flow passage 206, this second circulation pump 220, the heater 222, and the air conditioning heat exchanger 170 are arranged in series. In FIG. 16, the elements are arranged in the following order: the three-way valve 212, the second circulation pump 220, the heater 222, and the air conditioning heat exchanger 170. Alternatively, however, the various elements may be arranged between an inlet and an outlet of the three-way valve 212 in another order, and depending on the case, further include a switching valve or the like and be arranged in parallel.

The second circulation pump 220 is a coolant circulation pump that is smaller than the circulation pump 130 in the main cooling flow passage 102. The circulation pump 130 in the main cooling flow passage 102 has a capacity that allows it to operate sufficiently even with a large flowrate so that coolant can be circulated through the coolant flow passage that includes the radiator 110, the humidifier 54, and the fuel cell stack 22, quickly perform heat exchange, and be maintained at an appropriate temperature. In contrast, the second circulation pump 220 is designed to circulate coolant mainly through the air conditioning heat exchanger 170, and therefore can be a small capacity pump. Because this second circulation pump 220 is small, the operating efficiency with a low flowrate is better than that of the circulation pump 130 in the main cooling flow passage 102. Also, the second circulation pump 220 is preferably such that coolant is able to pass through it even when it is not being operated. This enables a decrease in the coolant flow efficiency to be prevented even when the second circulation pump 220 is not being operated.

The input/output flow passage 204 is a coolant flow passage that extends from the main cooling flow passage 102 to the three-way valve 212, so in this sense it can be considered a branch flow passage of part of the main cooling flow passage 102. The circulation flow passage 208 forms a looped flow passage because it is connected in parallel with the air conditioning bypass flow passage 206.

Figure 17:
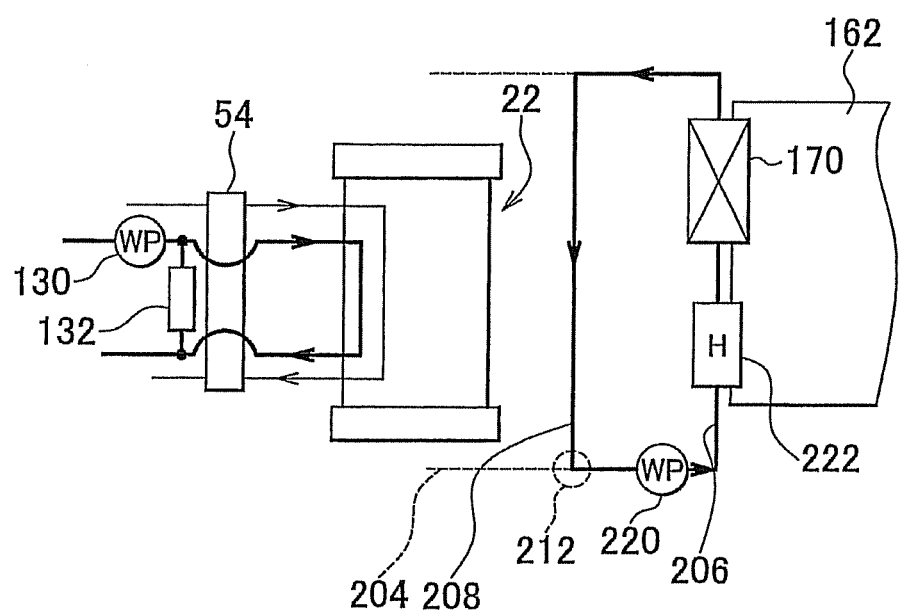
FIG. 17 is a view of an example of a connective state of the air conditioning bypass cooling flow passage in the embodiment shown in FIG. 16.

Next, the switching of the cooling flow passages by the three-way valve 212 will be described. The switching operation of the three-way valve 212 is performed by a cooling control portion, not shown, according to the operating state of the fuel cell stack 22. The cooling control portion may also be combined with the control portion 70 of the fuel cell operating system 10. FIG. 17 is a view showing the air conditioning bypass flow passage 206 connected to the circulation flow passage 208 in a closed loop which is achieved by switching the three-way valve 212. At this time, the input/output flow passage 204 is closed off from this closed loop flow passage. To make this flow passage easier to see, the three-way valve 212 is indicated by a broken line in FIG. 17. More specifically, this closed loop flow passage is formed by operating the three-way valve 212 so that it connects one side of the air conditioning bypass flow passage 206 with one side of the circulation flow passage 208.

Forming this kind of closed loop flow passage enables coolant to be circulated through the closed loop flow passage by the second circulation pump 220, independently from the main cooling flow passage 102. That is, coolant can be circulated between the heater 222 and the air conditioning heat exchanger 170. This connecting state is preferably used when the fuel cell stack 22 is still operating at a low temperature. As a result, cold coolant that has not yet been heated sufficiently by the fuel cell stack 22 can be prevented from being delivered to the air conditioning heat exchanger 170. Also, operating the heater 222 and the second circulation pump 220 enables coolant in the closed loop flow passage to be sufficiently heated and supplied to the air conditioning heat exchanger 170, which enables the vehicle cabin 162 to be heated both efficiently and quickly.

Figure 18:
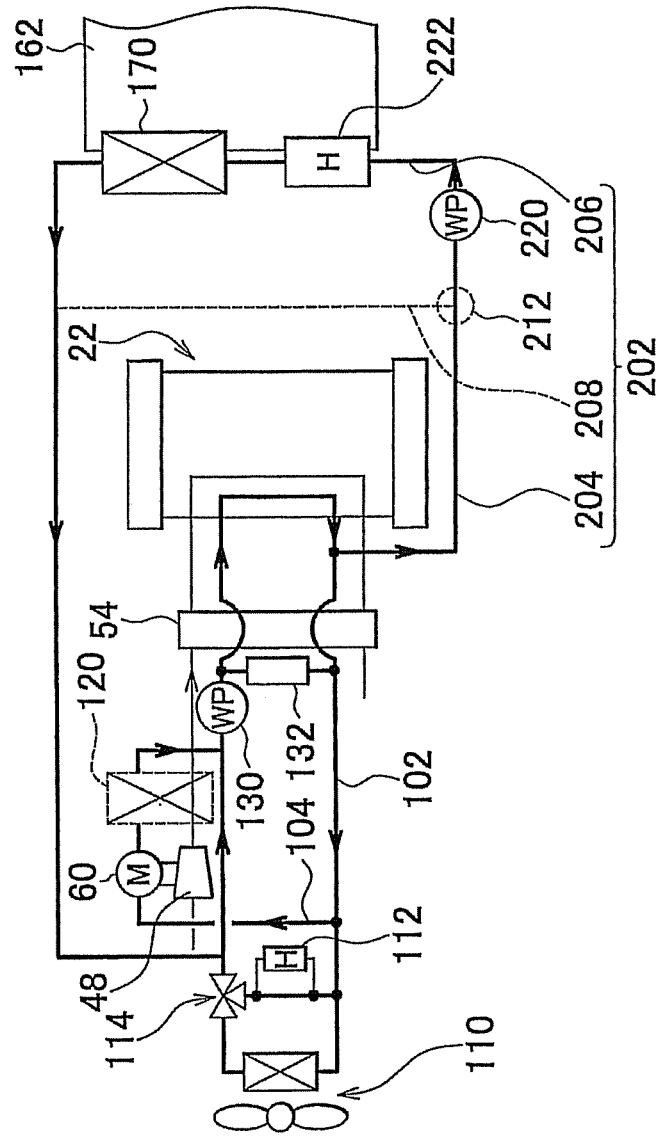
FIG. 18 is a view of another example of a connective state of the air conditioning bypass cooling flow passage in the embodiment shown in FIG. 16.

FIG. 18 is view showing a state in which the three-way valve 212 has been switched to cut off the circulation flow passage 208 and connect the input/output flow passage 204 and the air conditioning bypass flow passage 206 together. Here as well, just as in FIG. 17, the three-way valve 212 is indicated by a broken line to make the flow passage easier to see. More specifically, the three-way valve 212 is operated so that it connects one side of the air conditioning bypass flow passage 206 with one side of the input/output flow passage 204 which is connected to the coolant inlet from the main cooling flow passage 102. As a result, the circulation flow passage 208 is cut off while the input/output flow passage 204 and the air conditioning bypass flow passage 206 are directly connected together so the air conditioning bypass flow passage 206 can be arranged parallel to the main cooling flow passage 102 running through the fuel cell stack 22.

This connection is basically the same as the structures shown in FIGS. 6 and 15. That is, the air conditioning bypass cooling flow passage 202 shares the coolant with the main cooling flow passage 102 and so-called cooperative control is performed. Therefore, the three-way valve 212 switches the connection of the air conditioning bypass flow passage 206 between a cooperative control connection with the main cooling flow passage 102 and an independent control connection. When the air conditioning bypass flow passage 206 is connected via the cooperative control connection, the second circulation pump 220 is stopped. As described above, however, even when operation of the second circulation pump is stopped, coolant can still pass freely through the second circulation pump 220 so the coolant flow efficiency of the air conditioning bypass flow passage 206 does not decrease.

Cooperative control is performed when coolant which has been heated by operation of the fuel cell stack 22 and maintained at an appropriate temperature by the radiator 110 is circulated, as was described with reference to FIGS. 6 and 15. Therefore, the connection is switched between the closed loop flow passage connection shown in FIG. 17 and the cooperative control connection depending on the operating state of the fuel cell stack 22. For example, when the fuel cell stack 22 is not yet warmed up, the closed loop flow passage connection shown in FIG. 17 is employed and the heater 222 and the second circulation pump 220 are operated to increase the temperature of the coolant supplied to the air conditioning heat exchanger 170. When the fuel cell stack 22 warms up and the temperature of the coolant in the main cooling flow passage 102 rises, the connection switches to the direct connection shown in FIG. 18 and the heater 222 stops operating. As a result, the power required to heat the vehicle cabin 162 can be reduced, thereby improving fuel consumption.

The connection may switch between the closed loop flow passage connection shown in FIG. 17 and the direction connection shown in FIG. 18 when the temperature of the coolant in the fuel cell stack 22, i.e., the coolant temperature, reaches a predetermined target coolant temperature, for example. Alternatively, in order to further improve fuel consumption, the switch may be made even earlier, such as when the coolant temperature and reaches 50 degrees Celsius at which heat exchange is able to be performed and which is near the target coolant temperature.

Figure 19:
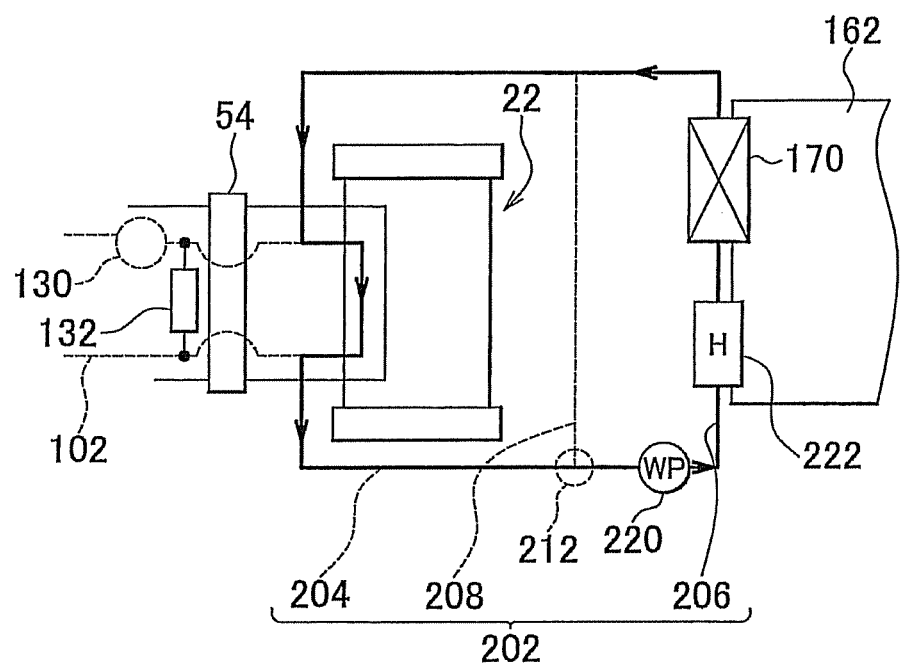
FIG. 19 is a view illustrating the operation of the circulation pump in the embodiment shown in FIG. 16.

FIG. 19 shows a modified example of the connection shown in FIG. 18. Here, coolant flowing through the air conditioning bypass flow passage 206 returns to the main cooling flow passage 102 upstream of the fuel cell stack 22. Also, the three-way valve 212 is operated to connect the one side of the input/output flow passage 204 which is connected to the side where coolant is taken from the main cooling flow passage 102, and one side of the air conditioning bypass flow passage 206. As a result, the circulation flow passage 208 is cut off and the input/output flow passage 204 is directly connected with the air conditioning bypass flow passage 206, at which point the second circulation pump 220 is operated and the circulation pump 130 of the main cooling flow passage 102 is stopped. Operation of the circulation pump 130 of the main cooling flow passage 102 and the second circulation pump 220 is switched by a cooling control portion, not shown, according to the operating state of the fuel cell stack 22.

When the circulation pump 130 of the main cooling flow passage 102 is not being operated, coolant does not circulate through the main cooling flow passage 102. Under these conditions, when the second circulation pump 220 is operated while the connection shown in FIG. 19 is established, coolant is circulated through a closed loop, flowing from the second circulation pump 220 to the heater 222, to the air conditioning heat exchanger 170, to the fuel cell stack 22, and then back again to the second circulation pump 220.

The operating state described above with reference to FIG. 19 may be used when the fuel cell stack 22 is operating under a low load such as when the fuel cell stack 22 is idling or operating intermittently. Because not much heat is generated when the fuel cell stack 22 is operating under a low load, cooling by the radiator 110 is often not necessary. Therefore, the circulation pump 130 of the main cooling flow passage 102 is stopped and coolant is instead circulated by the smaller second circulation pump 220. When the flowrate is low, the second circulation pump 220 operates at better efficiency than does the large capacity circulation pump 130. That is, the smaller second circulation pump 220 is able to, efficiently circulate coolant with less power than the large capacity circulation pump 130, which enables the fuel consumption to be improved when the fuel cell stack 22 is operating under a low load. When the fuel cell stack 22 is operating under a medium or high load, the second, circulation pump 220 is stopped and the coolant is circulated by operating only the circulation pump 130 of the main cooling flow passage 102, as described with reference to FIG. 9. Accordingly, the power required to drive the second circulation pump 220 can be reduced, which in turn enables fuel consumption at medium and high loads to be improved.

Further, when a user turns the air conditioning in the vehicle cabin 162 off after the coolant was heated using the closed loop flow passage connection shown in FIG. 17 and the vehicle cabin 162 warmed by the air conditioning heat exchanger 170, the connection switches to the direct connection shown in FIG. 18 or 19 while the heater 222 continues to operate. When the air conditioner is turned off, the fan and the like which blows warm air from the air conditioning heat exchanger 170 into the vehicle cabin 162 also turns off. Because the heater 222 is still operating, however, heated coolant can be supplied to the fuel cell stack 22, thus enabling the fuel cell stack 22 to warm up quickly.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A cooling system of a fuel cell which generates electricity by an electrochemical reaction produced by supplying a fuel gas to an anode side and an oxidizing gas to a cathode side, comprising:
    a cooling flow passage through which coolant circulates between a fuel cell stack and a first heat exchanger;
    a second heat exchanger which is provided in parallel with the fuel cell stack or the first heat exchanger and uses coolant that has been diverted from the cooling flow passage, wherein the second heat exchanger serves as a cooling apparatus of a gas compressor for supplying oxidizing gas, wherein the fuel cell is a vehicular fuel cell mounted in a vehicle, an air conditioning heat exchanger for air conditioning a vehicle cabin is provided in parallel with the fuel cell stack, and coolant that has been diverted from the cooling flow passage is used in the air conditioning heat exchanger;
    a first coolant circulation pump arranged in series in the cooling flow passage;
    an air conditioning bypass flow passage which is a bypass flow passage through which coolant that has been diverted from the cooling flow passage flows and in which the air conditioning heat exchanger, a heater, and a second coolant circulation pump are arranged;
    a circulation flow passage arranged in parallel with the air conditioning bypass flow passage; and
    air conditioning bypass switching means for switching between a first connection state in which the air conditioning bypass flow passage is connected with the cooling flow passage, and a second connection state in which the air conditioning bypass flow passage is connected with the circulation flow passage and the air conditioning bypass flow passage is disconnected from the fuel cell.

2. The cooling system of a fuel cell according to claim 1, wherein the air conditioning bypass switching means switches the connection between a closed loop connection in which the air conditioning bypass flow passage and the circulation flow passage are connected in a closed loop and cut off from the cooling flow passage, and a direct connection in which the air conditioning bypass flow passage and the cooling flow passage are directly connected and cut off from the circulation flow passage.

3. The cooling system of a fuel cell according to claim 2, wherein the second circulation pump is a pump which operates with better efficiency than the first circulation pump when the flow rate of the coolant is low; and pump operation controlling means is further provided for controlling operation of the first circulation pump and operation of the second circulation pump in connection with one another according to the operating state of the fuel cell, and when the fuel cell is operating under a low load, stopping operation of the first circulation pump and circulating coolant to the fuel cell stack using the second circulation pump.

* * * * *